(12) United States Patent
Li et al.

(10) Patent No.: US 11,546,265 B2
(45) Date of Patent: Jan. 3, 2023

(54) DATA TRANSMISSION METHOD, NETWORK DEVICE, AND SERVER FOR TRANSMITTING ASSISTANCE DATA

(71) Applicant: HUAWEI TECHNOLOGIES CO., LTD., Guangdong (CN)

(72) Inventors: Chenwan Li, Beijing (CN); Bo Lin, Beijing (CN); Yan Wang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 71 days.

(21) Appl. No.: 15/930,640

(22) Filed: May 13, 2020

(65) Prior Publication Data

US 2020/0274814 A1 Aug. 27, 2020

Related U.S. Application Data

(63) Continuation of application No. PCT/CN2017/110971, filed on Nov. 14, 2017.

(51) Int. Cl.
*H04L 47/2425* (2022.01)
*H04W 28/02* (2009.01)
(Continued)

(52) U.S. Cl.
CPC ..... *H04L 47/2433* (2013.01); *H04W 28/0226* (2013.01); *H04W 40/20* (2013.01); *H04W 64/003* (2013.01)

(58) Field of Classification Search
CPC ................. H04L 47/24; H04L 47/2408; H04L 47/2425; H04L 47/2433; H04L 47/2441;
(Continued)

(56) References Cited

U.S. PATENT DOCUMENTS 6,445,679 B1 9/2002 Taniguchi et al.
2003/0100339 A1 5/2003 Chen et al.
(Continued)

FOREIGN PATENT DOCUMENTS

AU 2009223307 B2 * 12/2012 ......... H04L 12/1895
CN 101547186 A 9/2009
(Continued)

OTHER PUBLICATIONS

3GPP TS 36.355 V14.3.0 (Sep. 2017), "3rd Generation Partnership Project; Technical Specification Group Radio Access Network; Evolved Universal Terrestrial Radio Access (E-UTRA); LTE Positioning Protocol (LPP) (Release 14)," Sep. 2017, 168 pages.
(Continued)

*Primary Examiner* — Kevin D Mew
(74) *Attorney, Agent, or Firm* — Fish & Richardson P.C.

(57) ABSTRACT

One example transmission method includes receiving, by a network device, a first transmission parameter that is sent by a server and that is used to transmit assistance data, where the first transmission parameter includes configuration information and/or priority information, and the configuration information is used to indicate a transmission cycle of each of one or more system messages and/or a size of a data volume that can be carried in each of the one or more system messages, and sending, by the network device, first configuration information to the server according to the first transmission parameter, where the first configuration information is used to indicate a transmission cycle of a first system message and a size of a data volume that can be carried in the first system message, and the one or more system messages include the first system message.

20 Claims, 11 Drawing Sheets

(51) Int. Cl.
*H04W 40/20* (2009.01)
*H04W 64/00* (2009.01)

(58) Field of Classification Search
CPC .............. H04L 47/2483; H04L 47/28; H04L 47/286; H04W 28/00; H04W 28/02; H04W 28/0226; H04W 40/20; H04W 64/00; H04W 64/003
See application file for complete search history.

(56) References Cited

U.S. PATENT DOCUMENTS

| | | | |
|---|---|---|---|
| 2004/0071154 A1* | 4/2004 | Wentink | H04L 12/40143 370/448 |
| 2008/0235744 A1* | 9/2008 | Hong | H04H 60/72 725/109 |
| 2010/0067496 A1* | 3/2010 | Choi | H04W 52/54 370/336 |
| 2010/0227611 A1* | 9/2010 | Schmidt | H04W 76/25 455/434 |
| 2011/0105119 A1* | 5/2011 | Bienas | H04W 36/0058 455/436 |
| 2011/0200024 A1 | 8/2011 | Karaoguz et al. | |
| 2011/0235584 A1* | 9/2011 | Chen | H04L 1/008 370/328 |
| 2011/0319025 A1* | 12/2011 | Siomina | H04B 7/0684 455/63.1 |
| 2012/0015666 A1* | 1/2012 | Horn | H04W 64/00 455/456.1 |
| 2013/0188624 A1* | 7/2013 | Lee | H04W 24/02 370/338 |
| 2013/0190009 A1* | 7/2013 | Johansson | H04W 4/029 455/456.1 |
| 2013/0190027 A1* | 7/2013 | Cao | H04W 52/0206 455/509 |
| 2013/0223626 A1 | 8/2013 | Edge et al. | |
| 2013/0258842 A1* | 10/2013 | Mizutani | H04L 45/48 370/228 |
| 2014/0023012 A1* | 1/2014 | Sato | H04B 7/0617 370/329 |
| 2014/0215281 A1* | 7/2014 | Tanaka | H04L 43/50 714/712 |
| 2014/0323152 A1* | 10/2014 | Zhang | H04W 64/00 455/456.1 |
| 2014/0349582 A1 | 11/2014 | Xiao et al. | |
| 2015/0327129 A1* | 11/2015 | Faccin | H04W 36/00837 370/331 |
| 2016/0080991 A1* | 3/2016 | Harris | H04W 24/02 455/436 |
| 2016/0183241 A1* | 6/2016 | Lee | H04W 72/0406 455/425 |
| 2016/0242000 A1* | 8/2016 | Venkatraman | H04W 4/21 |
| 2016/0277921 A1 | 9/2016 | Pinheiro et al. | |
| 2016/0338122 A1* | 11/2016 | Tsai | H04W 76/14 |
| 2016/0381596 A1 | 12/2016 | Hu et al. | |
| 2017/0164247 A1* | 6/2017 | Wiemann | H04W 48/12 |
| 2018/0049160 A1* | 2/2018 | Hong | H04W 4/70 |
| 2018/0234928 A1* | 8/2018 | Yasukawa | H04W 56/00 |
| 2018/0324740 A1* | 11/2018 | Edge | G01S 5/0236 |
| 2019/0182794 A1* | 6/2019 | Wong | H04W 52/0209 |

FOREIGN PATENT DOCUMENTS

| | | | | |
|---|---|---|---|---|
| CN | 103765927 A | 4/2014 | | |
| CN | 103957577 A | 7/2014 | | |
| CN | 104918324 A | 9/2015 | | |
| CN | 105676246 A | 6/2016 | | |
| CN | 106792998 A | 5/2017 | | |
| CN | 107005923 A | 8/2017 | | |
| CN | 104662994 B | 5/2018 | | |
| EP | 2983387 A1 * | 2/2016 | ............ | H04W 8/005 |
| WO | 2008106729 A1 | 9/2008 | | |
| WO | WO-2010031873 A1 * | 3/2010 | ............ | H04L 1/1812 |
| WO | WO-2012024321 A2 * | 2/2012 | ............ | H04L 5/0053 |
| WO | WO-2013172773 A1 * | 11/2013 | ............ | H04J 11/005 |
| WO | WO-2017100355 A1 * | 6/2017 | ............ | H04L 5/001 |
| WO | 2018204554 A1 | 11/2018 | | |

OTHER PUBLICATIONS

3GPP TS 36.455 V14.3.0 (Sep. 2017), "3rd Generation Partnership Project; Technical Specification Group Radio Access Network; Evolved Universal Terrestrial Radio Access (E-Utra); LTE Positioning Protocol A (LPPa) (Release 14)," Sep. 2017, 74 pages.

PCT International Search Report and Written Opinion issued in International Application No. PCT/CN2017/110971 on Jul. 30, 2018, 14 pages (with English translation).

Huawei, "5GC involved Inter registration area mobility," 3GPP TSG-RAN WG3 Meeting #97, R3-173153, Berlin, Germany, Aug. 21-25, 2017, 3 pages.

Office Action issued in Chinese Application No. 201780096738.4 dated Oct. 27, 2020, 12 pages (with English translation).

Office Action issued in Indian Application No. 202047022025 dated Jul. 23, 2021, 7 pages.

Extended European Search Report issued in European Application No. 17931957.9 dated Sep. 24, 2020, 20 pages.

Qualcomm Incorporated, "Broadcast of Positioning Assistance Data," 3GPP TSG-RAN WG2 Meeting #99, R2-1708539, Berlin, Germany, Aug. 21-25, 2017, 8 pages.

* cited by examiner

DATA TRANSMISSION METHOD, NETWORK DEVICE, AND SERVER FOR TRANSMITTING ASSISTANCE DATA

CROSS-REFERENCE TO RELATED APPLICATIONS

This application is a continuation of International Patent Application No. PCT/CN2017/110971, filed on Nov. 14, 2017, the disclosure of which is hereby incorporated by reference in its entirety.

TECHNICAL FIELD

This application relates to the communications field, and more specifically, to a data transmission method, a network device, and a server.

BACKGROUND

A global positioning system (Global Positioning System, GPS) is a high-precision positioning and navigation system, and is widely applied to various industries. However, due to impact of a satellite clock error, an ephemeris error, and an ionospheric error, precision that can be achieved by the method is approximately 15 meters. To satisfy application scenarios such as drones, smart driving, and vertical markets, more precise positioning is necessary. However, introduction of technologies such as real time kinematic (Real Time Kinematic, RTK) can effectively improve positioning precision, and the positioning precision of the RTK is at a centimeter level.

In an existing RTK technology, correction data or assistance data sent by a server is broadcast to a terminal device, so that a plurality of terminal devices perform high-precision positioning by using the broadcast correction data or assistance data. However, in an assistance data transmission process in the existing RTK technology, a transmission parameter specifically used to transmit the assistance data is not determined, behavior of the server, the network device, and the terminal device in the entire procedure is not clear. Consequently, the entire procedure of broadcasting the assistance data cannot be effectively supported.

SUMMARY

This application provides a data transmission method, a network device, and a server. The server sends, to the network device, a transmission parameter used to transmit assistance data, so that a procedure of broadcasting the assistance data is optimized.

According to a first aspect, a data transmission method is provided. The method includes: receiving, by a network device, a first transmission parameter that is sent by a server and that is used to transmit assistance data, where the transmission parameter includes configuration information and/or priority information, the configuration information is used to indicate a transmission cycle of each of one or more system messages and/or a size of a data volume that can be carried in each of the one or more system messages, and the priority information is used to indicate one or more priorities of one or more data types corresponding to the one or more system messages; and sending, by the network device, first configuration information to the server, where the first configuration information is associated with the first transmission parameter, and the first configuration information is used to indicate a transmission cycle of a first system message and a size of a data volume that can be carried in the first system message.

In some possible implementations, the configuration information may be used to indicate a transmission cycle of a system message carrying each data type in the assistance data and a size of a data volume of each data segment (or each data packet) obtained by segmenting the assistance data of each data type.

In some possible implementations, the server and the network device agree in advance on a correspondence between a data type and a system message, and the configuration information is used to indicate a transmission cycle of each data type in the assistance data and a size of a data volume of each data segment (or each data packet) obtained by segmenting the assistance data of each data type.

According to the transmission method in this embodiment of this application, before sending the assistance data, the server negotiates with the network device, and sends, to the network device, the configuration information and/or the priority information used to transmit the assistance data. This helps the network device more properly configure a resource used to transmit the assistance data.

With reference to the first aspect, in some possible implementations of the first aspect, the method further includes: receiving, by the network device, all or a part of the assistance data sent by the server according to the first configuration information; and sending, by the network device, all or the part of the assistance data to a terminal device.

With reference to the first aspect, in some possible implementations of the first aspect, the method further includes: receiving, by the network device, a second transmission parameter that is sent by the server and that is used to transmit the assistance data, where the second transmission parameter includes a time parameter and/or a repetition indication parameter, the time parameter is used to indicate expiration time information of each data type in the assistance data, and the repetition indication parameter is used to indicate a data type that needs to be repeatedly sent in the assistance data, where the sending, by the network device, all or the part of the assistance data to a terminal device includes: sending, by the network device, all or the part of the assistance data to the terminal device according to the second transmission parameter.

Specifically, the time parameter may specifically include at least one of an expiration time, a latency parameter (Time Latency), an overflow time, and a real-time time. The expiration time indicates expiration time information of assistance data of a data type or expiration time information of assistance data in a system message. The latency parameter and the overflow time also have a similar meaning, that is, data becomes invalid or precision deteriorates after an allowed latency length and the time overflow. The real-time time indicates a current time at which the assistance data is sent.

In some possible implementations, the expiration time information may be used to indicate an expiration time length or an invalid time length.

Specifically, the time parameter is a timer. When receiving a data segment or a data packet of a data type, the network device starts the timer. If the network device finds that a data segment or a data packet times out, the network device sends an empty data packet to the terminal device, or the network device sends an invalid data packet indication to the terminal device, or the network device sends a data packet (or a data segment) and an invalid data packet indication to the terminal device.

In some possible implementations, if the network device determines that a data segment or a data packet is valid, when the network device sends a data packet (or a data segment) to the network device, the network device indicates a remaining expiration time of the data packet (or the data segment).

In some possible implementations, the repetition indication parameter indicates a quantity of repetition times and/or a repetition cycle of a data type, and the network device repeatedly sends assistance data of a data type to the terminal device according to the repetition indication parameter.

In some possible implementations, the first transmission parameter includes the second transmission parameter.

According to the transmission method in this embodiment of this application, before sending the assistance data, the server negotiates with the network device, and sends, to the network device, the time parameter and/or the repetition indication parameter used to transmit the assistance data. This helps ensure validity of the assistance data, thereby improving positioning accuracy of the terminal device.

With reference to the first aspect, in some possible implementations of the first aspect, if the network device does not support the assistance data, the method further includes: sending, by the network device, a first indication to the server, where the first indication is used to indicate that the network device does not support broadcasting of the assistance data.

With reference to the first aspect, in some possible implementations of the first aspect, if the network device fails to configure a parameter used to send the assistance data or cannot send the assistance data temporarily, the method further includes: sending, by the network device, a first indication to the server, where the first indication is used to indicate that the server does not send all or a part of the assistance data to the network device in a first time period.

In some possible implementations, the method further includes: sending, by the network device, a waiting indication to the server, where the waiting indication is used to instruct to send, after a first time period, assistance data corresponding to a first data type.

In some possible implementations, the first indication is further used to indicate a reason why the network device does not support broadcasting of the assistance data.

According to the transmission method in this embodiment of this application, the server negotiates with the network device before sending the assistance data, and a waiting time is added to a first message sent by the network device to the server. This helps the server determine a resource configuration status of the network device, so that the server can more properly deliver the assistance data to the network device.

According to a second aspect, a data transmission method is provided. The method includes: sending, by a server to a network device, a first transmission parameter used to transmit assistance data, where the transmission parameter includes configuration information and/or priority information, the configuration information is used to indicate a transmission cycle of each of one or more system messages and/or a size of a data volume that can be carried in each of the one or more system messages, and the priority information is used to indicate one or more priorities of one or more data types corresponding to the one or more system messages; and receiving, by the server, first configuration information sent by the network device, where the first configuration information is associated with the first transmission parameter, and the first configuration information is used to indicate a transmission cycle of a first system message or a size of a data volume that can be carried in the first system message.

According to the transmission method in this embodiment of this application, before sending the assistance data, the server negotiates with the network device, and sends, to the network device, the configuration information and/or the priority information used to transmit the assistance data. This helps the network device more properly configure a resource used to transmit the assistance data.

With reference to the second aspect, in some possible implementations of the second aspect, the method further includes: sending, by the server to the network device, a second transmission parameter used to transmit the assistance data, where the second transmission parameter includes a time parameter and/or a repetition indication parameter, the time parameter is used to indicate expiration time information of each data type in the assistance data, and the repetition indication parameter is used to indicate a data type that needs to be repeatedly sent in the assistance data.

According to the transmission method in this embodiment of this application, before sending the assistance data, the server negotiates with the network device, and sends, to the network device, the time parameter and/or the repetition indication parameter used to transmit the assistance data. This helps ensure validity of the assistance data, thereby improving positioning accuracy of the terminal device.

With reference to the second aspect, in some possible implementations of the second aspect, the method further includes: sending, by the server, all or a part of the assistance data to the network device according to the first configuration information.

With reference to the second aspect, in some possible implementations of the second aspect, if the network device does not support the assistance data, the server receives a first indication sent by the network device, where the first indication is used to indicate that the network device does not support the assistance data. The method further includes: receiving, by the server, a waiting indication sent by the network device, where the waiting indication is used to instruct to send, after a first time period, assistance data corresponding to a first data type.

With reference to the second aspect, in some possible implementations of the second aspect, if the network device fails to configure a parameter used to send the assistance data or cannot send the assistance data temporarily, the method further includes: receiving, by the server, a first indication sent by the network device, where the first indication is used to indicate that the server does not send all or a part of the assistance data to the network device in a first time period.

According to the transmission method in this embodiment of this application, the server negotiates with the network device before sending the assistance data, and a waiting time is added to a first message sent by the network device to the server. This helps the server determine a resource configuration status of the network device, so that the server can more properly deliver the assistance data to the network device.

With reference to the second aspect, in some possible implementations of the second aspect, the method further includes: receiving, by the server, a second message sent by the terminal device, where the second message is used to request all or a part of the assistance data; and sending, by the server, all or the part of the assistance data to the terminal device according to the second message.

According to a third aspect, a data transmission method is provided. The method includes: receiving, by a terminal device, assistance data sent by a network device according to a transmission parameter, where the transmission parameter includes at least one of configuration information, priority information, a time parameter, and a repetition indication parameter, the configuration information is used to request a transmission cycle of each of one or more system messages and/or a size of a data volume that can be carried in each of the one or more system messages, the priority information is used to indicate one or more priorities of one or more data types corresponding to the one or more system messages, the time parameter is used to indicate expiration time information of each data type in the assistance data, and the repetition indication parameter is used to indicate a data type that needs to be repeatedly sent in the assistance data; and determining, by the terminal device, a location of the terminal device according to the assistance data.

According to the transmission method in this embodiment of this application, the terminal device receives the assistance data sent by the network device according to the transmission parameter. This helps the terminal device improve positioning accuracy.

With reference to the third aspect, in some possible implementations of the third aspect, before the receiving, by a terminal device, assistance data sent by a network device according to a transmission parameter, the method further includes: sending, by the terminal device, a first request message to a server, where the first request message is used to request to receive all or a part of the assistance data through broadcasting; and receiving, by the terminal device, all or the part of the assistance data sent by the server according to the first request message.

According to a fourth aspect, a data transmission method is provided. The method includes: receiving, by a network device, assistance data sent by a server and a third transmission parameter used to transmit the assistance data, where the third transmission parameter includes at least one of priority information, a time parameter, and a repetition indication parameter, the priority information is used to indicate a priority of each data type in the assistance data, the time parameter is used to indicate expiration time information of each data type in the assistance data, and the repetition indication parameter is used to indicate a data type that needs to be repeatedly sent in the assistance data; and sending, by the network device, all or a part of the assistance data to a terminal device according to the third transmission parameter.

According to the transmission method in this embodiment of this application, when the server directly sends the assistance data to the network device, a transmission parameter used to transmit the assistance data is carried. This helps the network device preferentially send assistance data with a higher priority to the terminal device, and helps prevent the terminal device from receiving invalid assistance data, thereby improving positioning accuracy of the terminal device.

With reference to the fourth aspect, in some possible implementations of the fourth aspect, the third transmission parameter further includes configuration information. The configuration information is used to indicate a transmission cycle of each of one or more system messages and/or a size of a data volume that can be carried in each of the one or more system messages. The method further includes: sending, by the network device, second configuration information to the server, where the second configuration information is associated with the third transmission parameter, and the second configuration information is used to indicate a transmission cycle of a second system message and a size of a data volume that can be carried in the second system message.

According to a fifth aspect, a data transmission method is provided. The method includes: determining, by a server, a third transmission parameter used to transmit assistance data, where the third transmission parameter includes at least one of priority information, a time parameter, and a repetition indication parameter, the priority information is used to indicate a priority of each data type in the assistance data, the time parameter is used to indicate expiration time information of each data type in the assistance data, and the repetition indication parameter is used to indicate a data type that needs to be repeatedly sent in the assistance data; and sending, by the server, the assistance data to a network device.

According to the transmission method in this embodiment of this application, when the server directly sends the assistance data to the network device, a transmission parameter used to transmit the assistance data is carried. This helps the network device preferentially send assistance data with a higher priority to a terminal device, and helps prevent the terminal device from receiving invalid assistance data, thereby improving positioning accuracy of the terminal device.

With reference to the fifth aspect, in some possible implementations of the fifth aspect, the third transmission parameter further includes configuration information. The configuration information is used to indicate a transmission cycle of each of one or more system messages and/or a size of a data volume that can be carried in each of the one or more system messages. The method further includes: receiving, by the server, second configuration information sent by the network device, where the second configuration information is associated with the third transmission parameter, the second configuration information is used to indicate a transmission cycle of a second system message and a size of a data volume that can be carried in the second system message, and the one or more system messages include the second system message.

According to a sixth aspect, a data transmission method is provided. The method includes: receiving, by a terminal device, assistance data sent by a network device according to a transmission parameter, where the transmission parameter includes at least one of configuration information, priority information, a time parameter, and a repetition indication parameter, the configuration information is used to indicate a transmission cycle of each of one or more system messages and/or a size of a data volume that can be carried in each of the one or more system messages, the priority information is used to indicate a priority of each data type in the assistance data, the time parameter is used to indicate expiration time information of each data type in the assistance data, and the repetition indication parameter is used to indicate a data type that needs to be repeatedly sent in the assistance data; and determining, by the terminal device, a location of the terminal device according to the assistance data.

According to the transmission method in this embodiment of this application, the terminal device receives the assistance data sent by the network device according to the transmission parameter. This helps the terminal device improve positioning accuracy.

With reference to the sixth aspect, in some possible implementations of the sixth aspect, before the receiving, by a terminal device, assistance data sent by a network device according to a transmission parameter, the method further includes: sending, by the terminal device, a first request message to a server, where the first request message is used to request to receive the assistance data through broadcast.

According to a seventh aspect, this application provides a network device. The network device is configured to perform the method according to the first aspect or any possible implementation of the first aspect. Specifically, the network device includes modules configured to perform the method according to the first aspect or any possible implementation of the first aspect.

According to an eighth aspect, a server is provided. The server is configured to perform the method according to the second aspect or any possible implementation of the second aspect. Specifically, the server includes modules configured to perform the method according to the second aspect or any possible implementation of the second aspect.

According to a ninth aspect, a terminal device is provided. The terminal device is configured to perform the method according to the third aspect or any possible implementation of the third aspect. Specifically, the terminal device includes modules configured to perform the method according to the third aspect or any possible implementation of the third aspect.

According to a tenth aspect, another network device is provided. The network device includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal. When the processor executes the instruction stored in the memory, the processor is enabled to perform the method according to the first aspect or any possible implementation of the first aspect.

According to an eleventh aspect, another server is provided. The server includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal. When the processor executes the instruction stored in the memory, the processor is enabled to perform the method according to the second aspect or any possible implementation of the second aspect.

According to a twelfth aspect, another terminal device is provided. The terminal device includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal. When the processor executes the instruction stored in the memory, the processor is enabled to perform the method according to the third aspect or any possible implementation of the third aspect.

According to a thirteenth aspect, a data transmission system is provided. The system includes the network device according to the seventh aspect or any possible implementation of the seventh aspect, the server according to the eighth aspect or any possible implementation of the eighth aspect, and the terminal device according to the ninth aspect or any possible implementation of the ninth aspect; or the system includes the network device according to the tenth aspect or any possible implementation of the tenth aspect, the server according to the eleventh aspect or any possible implementation of the eleventh aspect, and the terminal device according to the twelfth aspect or any possible implementation of the twelfth aspect.

According to a fourteenth aspect, a computer program product is provided. The computer program product includes computer program code. When the computer program code is run on a computer, the computer is enabled to perform the method according to the first aspect or any possible implementation of the first aspect.

According to a fifteenth aspect, a computer program product is provided. The computer program product includes computer program code. When the computer program code is run on a computer, the computer is enabled to perform the method according to the second aspect or any possible implementation of the second aspect.

According to a sixteenth aspect, a computer program product is provided. The computer program product includes computer program code. When the computer program code is run on a computer, the computer is enabled to perform the method according to the third aspect or any possible implementation of the third aspect.

According to a seventeenth aspect, a computer-readable medium is provided and is configured to store a computer program. The computer program includes an instruction used to perform the method according to the first aspect or any possible implementation of the first aspect.

According to an eighteenth aspect, a computer-readable medium is provided and is configured to store a computer program. The computer program includes an instruction used to perform the method according to the second aspect or any possible implementation of the second aspect.

According to a nineteenth aspect, a computer-readable medium is provided and is configured to store a computer program. The computer program includes an instruction used to perform the method according to the second aspect or any possible implementation of the second aspect.

According to a twentieth aspect, a chip system is provided and is applied to a network device. The chip system includes one or more processors, one or more memories, and an interface circuit. The interface circuit is responsible for information exchange between the chip system and an external device. The one or more memories, the interface circuit, and the one or more processors are interconnected by using a line. The one or more memories store an instruction. The instruction is executed by the one or more processors, to perform operations of the network device in the methods according to the foregoing aspects.

According to a twenty-first aspect, a chip system is provided and is applied to a server. The chip system includes one or more processors, one or more memories, and an interface circuit. The interface circuit is responsible for information exchange between the chip system and an external device. The one or more memories, the interface circuit, and the one or more processors are interconnected by using a line. The one or more memories store an instruction. The instruction is executed by the one or more processors, to perform operations of the server in the methods according to the foregoing aspects.

According to a twenty-second aspect, a chip system is provided and is applied to a terminal device. The chip system includes one or more processors, one or more memories, and an interface circuit. The interface circuit is responsible for information exchange between the chip system and an external device. The one or more memories, the interface circuit, and the one or more processors are interconnected by using a line. The one or more memories store an instruction. The instruction is executed by the one or more processors, to perform operations of the terminal device in the methods according to the foregoing aspects.

DESCRIPTION OF EMBODIMENTS

Figure 1:
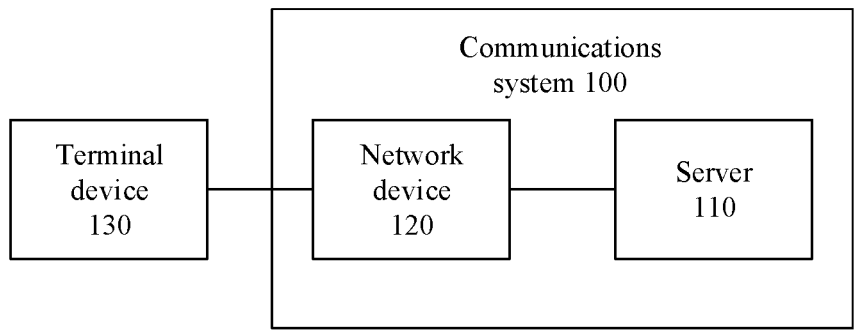
FIG. 1 is a schematic diagram of an application scenario of a technical solution according to an embodiment of this application.

The following describes technical solutions of this application with reference to accompanying drawings.

The technical solutions of the embodiments of this application may be applied to various communications systems, such as: a global system for mobile communications (Global System of Mobile Communication, GSM), a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD), a universal mobile telecommunications system (Universal Mobile Telecommunications System, UMTS), a worldwide interoperability for microwave access (Worldwide Interoperability for Microwave Access, WiMAX) communications system, a future 5th generation (5th Generation, 5G) system, or a new radio (New Radio, NR) system.

The terminal device in the embodiments of this application may also be referred to as user equipment, an access terminal, a subscriber unit, a subscriber station, a mobile station, a mobile console, a remote station, a remote terminal, a mobile device, a user terminal, a terminal, a wireless communication device, a user agent, a user apparatus, or the like. The terminal device may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, a vehicle-mounted device, a wearable device, a terminal device in a future 5G network, or a terminal device in a future evolved public land mobile network (Public Land Mobile Network, PLMN). This is not limited in the embodiments of this application.

A network device in the embodiments of this application may be a device configured to communicate with the terminal device. The network device may be a base transceiver station (Base Transceiver Station, BTS) in the global system for mobile communications (Global System of Mobile communication, GSM) or the code division multiple access (Code Division Multiple Access, CDMA) system, or may be a NodeB (NodeB, NB) in the wideband code division multiple access (Wideband Code Division Multiple Access, WCDMA) system, or may be an evolved NodeB (Evolutional NodeB, eNB or eNodeB) in the LTE system, or may be a radio controller in a cloud radio access network (Cloud Radio Access Network, CRAN) scenario. Alternatively, the network device may be a relay node, an access point, a vehicle-mounted device, a wearable device, a network device in the 5G network, a network device in the future evolved PLMN network, or the like. This is not limited in the embodiments of this application.

FIG. 1 is a schematic diagram of an application scenario of a technical solution according to an embodiment of this application. As shown in FIG. 1, the technical solution in this embodiment of this application may be applied to a communications system 100. The communications system 100 includes a server 110 and a network device 120. The server 110 obtains assistance data used by a terminal device 130 to perform positioning, and sends the assistance data to the network device 120. After receiving the assistance data, the network device 120 broadcasts the assistance data to the terminal device 130, and the terminal device 130 determines a location of the terminal device 130 according to the assistance data.

It should be understood that the server 110 in FIG. 1 may be an evolved serving mobile location center (Evolved Serving Mobile Location Center, E-SMLC), a gateway mobile location center (Gateway Mobile Location Center, G-MLC), or a real-time kinematic (Real-Time Kinematic, RTK) server.

It should be further understood that the network device 120 in FIG. 1 may be configured to connect the terminal device 130 to a network element of the server 110. The network device 120 may be an eNB, a BS, an internet of thing (Internet of Thing, IoT), and a base station gNB in a 5G network.

It should be further understood that the terminal device 130 in FIG. 1 may be a terminal device supporting communication types such as machine to machine (Machine to Machine, M2M) communication, enhanced machine type communications (enhanced Machine Type Communications, eMTC), narrow band Internet of Thing (Narrow Band Internet of Thing, NB IoT), long term evolution (Long Term Evolution, LTE), a chip (for example, a sensor chip), and a next-generation access network (New RAN, NR).

Figure 2:
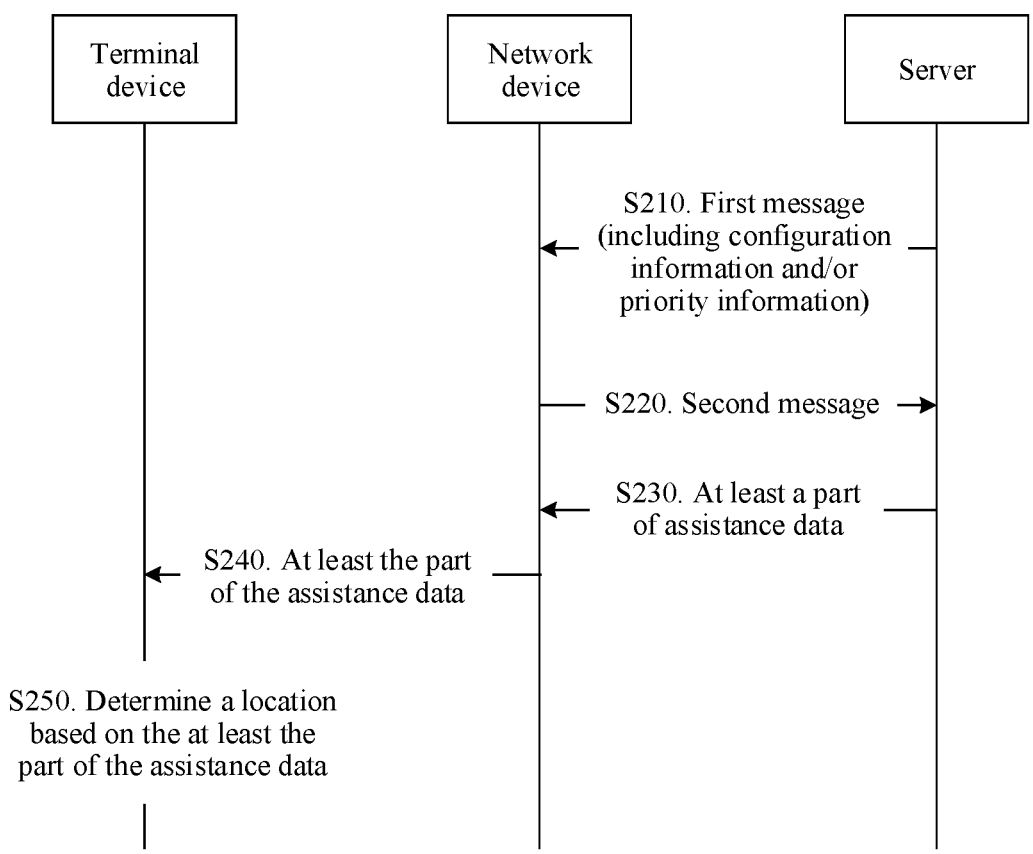
FIG. 2 is a schematic flowchart of a data transmission method according to an embodiment of this application.

FIG. 2 is a schematic flowchart of a data transmission method 200 according to an embodiment of this application. As shown in FIG. 2, a server in FIG. 2 may correspond to the server 110 in FIG. 1, a network device in FIG. 2 may correspond to the network device 120 in FIG. 1, and a terminal device in FIG. 2 may correspond to the terminal device 130 in FIG. 1. The method 200 includes the following steps.

S210. The server sends a first message to the network device, and the network device receives the first message sent by the server, where the first message is used to indicate that the server is to broadcast assistance data or is used to request configuration information used to broadcast assistance data, the first message includes a transmission parameter, and the transmission parameter includes the configuration information and/or priority information.

Specifically, after obtaining the assistance data used by the terminal device to perform positioning, the server sends the first message to the network device. The first message is used to indicate that the server is to broadcast the assistance data or is used to request the configuration information used to broadcast the assistance data. The first message includes a transmission parameter of the assistance data expected by the server. The transmission parameter in the first message is used to instruct the network device to transmit the assistance data expected by the server. The transmission parameter includes the configuration information and/or the priority information. The configuration information is used to indicate a transmission cycle of each of one or more system messages and/or a size of a data volume that can be carried in each of the one or more system messages. The one or more system messages are used to carry the assistance data. The priority information is used to indicate a priority of each data type in the assistance data.

Optionally, before the server sends the first message to the network device, the method further includes: sending, by the terminal device, a first request message to the server; and receiving, by the server, the first request message sent by the terminal device, where the first request message is used to request to obtain the assistance data through broadcasting.

For example, the first request message may be LTE positioning protocol (LPP) signaling, and a broadcast request field or another field may be added to the LPP signaling. A signaling name may be a providing capability, or may be other signaling.

Optionally, the configuration information may be used to indicate a transmission cycle of a system message carrying each data type in the assistance data and/or a size of a data volume of each data segment (or each data packet) obtained by segmenting the assistance data of each data type.

Optionally, the server and the network device agree in advance on a correspondence between a data type and a system message, and the configuration information is used to indicate a transmission cycle of each data type in the assistance data and a size of a data volume of each data segment (or each data packet) obtained by segmenting the assistance data of each data type.

Optionally, the network device receives data type information from the server, where the data type information includes an identifier of a data type and a first transmission parameter corresponding to the data type, and the first transmission parameter includes a transmission cycle corresponding to the data type, a corresponding data block size, or a corresponding priority.

It should be understood that the data type may be a system message type, or may be another type. This is not limited in this application.

It should be understood that the configuration information may include only the size of the data volume that can be carried in each of the one or more system messages expected by the server, and the transmission cycle of each system message may be agreed on by the network device and the server. Alternatively, the configuration information may include only the transmission cycle of each of the one or more system messages expected by the server, and the size of the data volume that can be carried in each system message may be agreed on by the network device and the terminal device. Alternatively, the configuration information includes the transmission cycle of each of the one or more system messages expected by the server and the size of the data volume that can be carried in each of the one or more system messages. Table 1 shows types and content of several types of configuration information.

TABLE 1

| Types and content of configuration information | |
|---|---|
| Configuration information type | Information content |
| Type 1 | Transmission cycle of each of one or more system messages |
| Type 2 | Size of a data volume that can be carried in each of one or more system messages |
| Type 3 | Transmission cycle of each of one or more system messages and a size of a data volume that can be carried in each of the one or more system messages |

It should be further understood that the configuration information may be configuration information of a system information block (System Information Block, SIB) or system information (System Information, SI), for example, a transmission cycle and/or a transport block size (Transport Block Size, TBS) of the SIB or the SI. The transmission cycle of the SIB or the SI is used to indicate a transmission cycle value of a SIB or a SI, and the TBS is used to indicate a size of a data volume allowed for transmission.

For example, data types of the assistance data obtained by the server include a data type 1 and a data type 2. The server may request, in the first message, to configure transmission cycles of the data type 1 and the data type 2 to 80 ms and 160 ms respectively, and configure TBSs to 100 bytes and 150 bytes respectively.

It should be understood that the first message may further carry priority information of each data type in the assistance data, and the priority information may be used to indicate whether a resource is preferentially configured for data included in a corresponding data type or a SIB. The priority information may be represented by a number, for example, an integer such as 1, 2, or 3. 1 indicates a highest priority, and 2 indicates a second highest priority. Alternatively, on the contrary, a larger number indicates a higher priority.

Alternatively, the priority information may be represented by high, medium, low, or the like. This application is not limited thereto.

It should be understood that the priority information may be obtained by the server from another network element or device, or the priority information may be set by the server according to implementation and a quantity of users that use data. For example, if a quantity of users that use a data type 1 is larger, a priority of the data type 1 may be higher.

For example, data types of the assistance data obtained by the server include the data type 1 and the data type 2, and a priority of the data type 1 is higher than a priority of the data type 2. In this case, a priority 1 may be configured for the data type 1, and a priority 2 may be configured for the data type 2.

It should be understood that in this embodiment of this application, the server and the network device may agree in advance on a correspondence between a data type of assistance data and a system message. Table 2 shows a correspondence between a data type of assistance data and a system message.

TABLE 2

Correspondence between a data type and a system message

| System message | Data type |
| --- | --- |
| 1 | 1 |
| 2 | 2 |
| 3 | 3 and 4 |

Specifically, assistance data of the data type 1 may be carried in the system message 1 and broadcast by the network device to the terminal device, assistance data of the data type 2 may be carried in the system message 2 and broadcast by the network device to the terminal device, and assistance data of the data type 3 and the data type 4 may be carried in the system message 3 and broadcast by the network device to the terminal device.

It should be understood that before the server sends the first message to the network device, the server obtains the assistance data used for broadcasting. A specific obtaining manner is not limited in this embodiment of this application.

Optionally, the assistance data is related to a global navigation satellite system (Global Navigation Satellite System, GNSS), and during transmission, a GNSS type of the first message may be indicated in the first message. For example, a GNSS ID may be used for implementation.

It should be understood that the first message may be used to request to transmit assistance data of RTK, or may be used to transmit assistance data of another positioning method, for example, observed time difference of arrival (Observed Time Difference of Arrival, OTDOA), assisted-global navigation satellite system (Assisted-Global Navigation Satellite System, A-GNSS), or precise point positioning (Precise Point Positioning, PPP), PPP-RTK, or observe space representation (Observation Space Representation, OSR). These positioning methods include differential position, differential pseudo range, differential pseudo range such as phase smoothing, differential carrier phase, local area differential global positioning system (Global Positioning System, GPS), wide area differential GPS, virtual reference station (Virtual Reference Station, VRS) network RTK, and media access control (Media Access Control, a MAC) network RTK, flchen korrektur parameter (Flchenkorrekturparameter, FKP) network RTK, real time DGPS (Real Time DGPS, RTD), state space representation (State Space Representation, SSR), differential global positioning system (DGPS), and the like. Transmission configurations of these methods are accordingly transmitted.

In an actual transmission process, a configuration of a data type may be requested in the first message, or a system message number corresponding to a data type may be requested in the first message, for example, SIB x and SIB y. Table 3 shows a correspondence between a data type (or a system message number) and a requested configuration.

TABLE 3

Correspondence a between data type and a request configuration

| Data type or system message ID | Configuration |
| --- | --- |
| SIBs x, y, and z (or data types 1, 2, and 3) | Transmission cycle, TBS, priority information, update cycle, and GNSS ID (GNSS type) |
| OTDOA configuration | SIB transmission cycle and TBS |

It should be understood that the network device receives data type information from the server, where the data type information includes an identifier of a data type and a first transmission parameter corresponding to the data type. The network device returns a corresponding system message number to the server by searching for a corresponding relationship between a data type and a request configuration.

For different data types, refer to the following classifications. Alternatively, several types of the following data may be combined as one data type. Different data types may be transmitted by different SIBs. One SIB may transmit one data type, or one SIB may transmit a plurality of data types. Tables 4 and 5 show classifications of several different data types.

TABLE 4

Classification of different data types

| GNSS-reference time | Common positioning |
| --- | --- |
| GNSS-reference location | assistance data |
| GNSS-ionospheric model | |
| GNSS-earth orientation parameters | |
| RTK common assistance data 1 | |
| RTK common assistance data 2 | |
| . . . | |
| GNSS-time model list | GNSS-related |
| GNSS-differential corrections | positioning |
| GNSS-navigation model | assistance |
| GNSS-real time integrity | data (positioning |
| GNSS-data bit assistance | assistance data is |
| GNSS-acquisition assistance | associated with |
| GNSS-acquisition assistance | different GNSS |
| GNSS-almanac | types) |
| GNSS-UTC-model | |
| GNSS-auxiliary information | |
| BDS-differential corrections-r12 | |
| BDS-grid model parameter-r12 | |
| RTK generic assistance data 1 | |
| RTK generic assistance data 2 | |

TABLE 5

Classification of different data types

| SSR message | System/RTCM SSR message (*proposed) |
| --- | --- |
| Orbit parameters | Orbits |
| Clock parameters | Clocks |

TABLE 5-continued

Classification of different data types

| | |
|---|---|
| Code biases | Code biases |
| Combined orbit and clock parameters | Combined orbits and clocks |
| Vertical total electron content | VTEC (Vertical Total electron content) |
| Phase biases | Phase biases |
| On any straight line | Slant Iono (STEC) |
| Tropospheric parameters | Troposphere |

It should be understood that assistance data of each positioning method may include a plurality of assistance data types. Different assistance data types may be updated in different cycles, or may be carried in different SIBs. Therefore, data types of different assistance data may need to be separately transmitted.

Optionally, the first message may further carry data of an encryption key. After receiving the data of the encryption key, the network device transparently transmits the data of the encryption key to the terminal device. Specifically, the data of the encryption key may be sent together with each requested data type, or only one or more pieces of data of the encryption key may be sent. If one piece of data of the encryption key is sent, it indicates that the key is used for all data. The encryption key may alternatively be represented as security information.

S220. The network device sends a second message to the server in response to the first message, where the second message includes a transmission cycle of a first system message and a size of a data volume that can be carried in the first system message.

Specifically, after receiving the first message, the network device feeds back the second message to the server by parsing content of the first message. The second message may be a response message of the network device to the first message sent by the server. The second message carries a configuration of the network device for scheduling a resource. The second message includes a transmission cycle of the first system message and the size of the data volume that can be carried in the first system message. The one or more system messages include the first system message. Alternatively, the second message is used to indicate that the network device does not support broadcasting of the assistance data.

It should be understood that the "first system message" in this embodiment of this application does not limit a quantity of system messages. The first system message may be one system message, or may be a plurality of system messages. This is not limited in this embodiment of this application.

It should be further understood that the process of S210 before the network device sends the second message may alternatively not exist. For example, when a resource of the network device changes or at another moment, the network device may actively send a configuration update message to the server, where the configuration update message carries configuration information of a current system message of the network device, for example, a transmission cycle of the current system message and a size of a data volume that can be carried in the current system message.

For example, the server requests, in the configuration information, a transmission cycle of each of at least one system message and/or a size of a data volume that can be carried in each of the at least one system message. The network device makes a final decision according to the first message, and returns final configuration information. The final configuration information may be the same as or different from that requested by the server. For broadcast configurations of a plurality of SIBs or a plurality of data types requested by the server, the network device may determine a configuration and correspondingly return final configuration information, or may configure only some SIBs or data types due to a resource limitation or another reason, or may not configure the plurality of SIBs or the plurality of data types.

For another example, if the server requests, in the first message, to configure a transmission cycle and a TBS of a data type 1 (transmitted in the SIB 1) to be 80 ms and 100 bytes respectively, and a transmission cycle and a TBS of a data type 2 (transmitted in the SIB 2) to be 160 ms and 150 bytes respectively, the network device may add, to the second message, configurations 80 ms and 100 bytes corresponding to the data type 1 or the SIB 1, and configurations 160 ms and 150 bytes corresponding to the data type 2 or the SIB 2; or may return, to the server, only configurations 80 ms and 100 bytes corresponding to the message data type 1 or the SIB 1, and does not configure transmission of the data type 2. Whether both can be specifically configured and whether a configured value is the same as a value requested to be configured by the server depend on implementation of the network device.

For still another example, the server requests, in the first message, to configure a transmission cycle and a TBS of a data type 1 (transmitted in the SIB 1) to be 80 ms and 100 bytes respectively, a transmission cycle and a TBS of a data type 2 (transmitted in the SIB 2) to be 160 ms and 150 bytes respectively, a transmission cycle and a TBS of a data type 3 (transmitted in the SIB 3) to be 100 ms and 120 bytes respectively, and a transmission cycle and a TBS of a data type 4 (transmitted in the SIB4) to be 200 ms and 180 bytes respectively. In addition, the first message includes priority information. A priority of the data type 1 is 1. A priority of the data type 3 is 2. A priority of the data type 4 is 3. A priority of the data type 2 is 4. In this case, if a resource of the network device is limited or there is another reason, only assistance data of the data type 1 and the data type 3 may be configured. In this case, a transmission cycle 80 ms and a TBS 100 bytes of the SIB 1 and a transmission cycle 100 ms and a TBS 120 bytes of the SIB 3 are carried in the second message.

For still another example, the server requests, in the first message, to configure transmission cycles and TBSs of a data type 1 (transmitted in the SIB 1), a data type 2 (transmitted in the SIB 2), a data type 3 (transmitted in the SIB 3), and a data type 4 (transmitted in the SIB4). After receiving the first message, the network device determines to send a second message to the server due to limitation of a current resource or another reason, where the second message is used to indicate that the network device does not support broadcasting of the assistance data.

It should be understood that the first system message may be all or a part of the at least one system message; or the first system message is not in the at least one system message, and the network device may send, to the server, a transmission cycle of another system message associated with the at least one system message and a size of a data volume carried in the another system message.

Optionally, the network device sends first data type information to the server. The first data type information is associated with the data type information, and includes an identifier of the first data type and a first configuration parameter of the first data type. The first configuration parameter includes a transmission cycle corresponding to the first data type or a size of a corresponding data block. The first data type information may correspond to a data type.

For example, the identifier of the first data type may be different from an identifier type of the foregoing data type. For example, the foregoing data type is: common data 1-30 ms, 20 kb, a SIB 22, a SIB 23, and a priority 1; and common data 2-50 ms, 50 kb, and a SIB 20. In this case, the first data type may be SIB 22-30 ms and 20 kb.

It should be understood that, in this embodiment of this application, configuration information exchanged between the server and the network device may be configured for one or more data types, or may be SIB types corresponding to the data types, for example, a SIB 22 and a SIB 23. In other words, a representation form of an interface is not limited.

For example, if there is a correspondence between a data type and request configuration information, information sent by the server to the network device may be shown in Table 6, and information returned by the network device to the server may be shown in Table 7.

TABLE 6

Correspondence between a data type and a request configuration

| Information element | Range | Information element definition |
|---|---|---|
| Request list information | 1 to a maximum requested data type | |
| Assistance data type | | Requested data type |
| SIB transmission feature | | Including a size of a data volume transmitted by a SIB and/or a transmission cycle of the SIB |

TABLE 7

Correspondence between a data type and a request configuration

| Information element | Range | Information element definition |
|---|---|---|
| Configuration list information | 1 to a maximum requested data type or a data type supporting broadcasting | |
| Assistance data type | | Requested data type |
| SIB transmission feature | | Including a size of a data volume transmitted by a SIB and/or a transmission cycle of the SIB |

Optionally, the configuration information includes a cycle or a size of a data volume that can be carried in the one or more system messages expected by the server, or may not be bound to a specific SIB block type, that is, it is not limited to types such as a SIB X and a SIB Y Information sent by a positioning server to a base station may be as follows: The information sent by the server to the network device may be shown in Table 8, and the information returned by the network device to the server may be shown in Table 9.

TABLE 8

Correspondence between a data type and a request configuration

| Information element | Range | Information element definition |
|---|---|---|
| Request list information | 1 to a maximum requested data type | |
| SIB transmission feature | | Including a size of a data volume transmitted by a SIB and/or a transmission cycle of the SIB |

TABLE 9

Correspondence between a data type and a request configuration

| Information element | Range | Information element definition |
|---|---|---|
| Configuration list information | 1 to a maximum requested data type or a data type supporting broadcasting | |
| SIB transmission feature | | Including a size of a data volume transmitted by a SIB and/or a transmission cycle of the SIB |

It should be understood that, if the network device does not receive a displayed priority indication, it may be considered that the server sequentially decreases or increases priorities in a sequence indicated in a list of requested configurations, that is, the first information requested to be configured may have a highest priority (or a lowest priority), and the rest may be deduced by analogy. When network device resources are limited, some resources may be preferentially configured according to the information.

It should be understood that for a priority configuration, the network device may allocate an equivalent size of data volume.

Optionally, if the network device fails to configure a parameter used to send the assistance data or cannot send the assistance data temporarily, the method further includes: sending, by the network device, a first indication to the server, where the first indication is used to indicate that the server does not send all or a part of the assistance data to the network device in a first time period.

Optionally, when the second message is used to indicate that broadcasting of the assistance data is not supported temporarily or when a configuration failure or a failure message is returned, the second message further includes a reason why broadcasting is not supported and/or a first waiting time period. In this case, when receiving the second message, the server may wait for the first time period and send the assistance data to the network device.

Specifically, the second message sent by the network device to the positioning server may also be a failure indication message, and the second message is used to indicate that the network device does not support broadcasting of the assistance data, does not support the assistance data temporarily, has a configuration failure, or so on. The reason why the network device does not support broadcasting of may be that the network device does not support broadcasting, or a resource is limited, or an overload occurs. In a scenario in which broadcasting cannot be performed temporarily, the network device may add an indication time to the second message to be sent to the server, to indicate that the positioning server may attempt to send data after a period of time.

S230. The server sends all or the part of the assistance data to the network device according to the second message.

It should be understood that a message for sending data by the server to the network device may be an auxiliary message transmission message, and a signaling name is not limited.

It should be further understood that the second message includes a transmission cycle of the first system message and a size of a data volume that can be carried in the first system message. When the one or more system messages include the first system message, the server may send all or the part of the assistance data to the network device in the following two cases:

(1) The server sends the assistance data to the network device.

Specifically, the server sends the assistance data according to a configuration of the network device. If the network device determines the configuration in the second message and correspondingly returns the final configuration information, the server may send the assistance data to the network device according to the second message. For example, the server may send segmented assistance data to the network device, the segmented assistance data may be segmented according to a specific TBS that is of the SIB and that is carried in the second message sent by the network device, and is sent to the network device. A size of each data segment does not exceed a limit of a TBS configuration size of the network device.

It should be understood that when sending the assistance data to the network device, the server may perform segment indication on data of each data type or data included in each SIB, for example, an integer such as a packet sequence number 1, 2, or 3, or a first segment, a second segment, . . . , and a last data segment indication. The last data segment indication may be used to indicate the last segment, and the terminal device may process previous data segments together according to the indication. The last data segment indication may also be used to indicate the last data segment of the data type, indicating that no assistance data of the data type is subsequently transferred.

Optionally, the server sends instruction information to the network device, where the instruction information is used to instruct the network device to stop broadcasting all assistance data or stop broadcasting assistance data currently broadcast on the network device.

(2) The server sends a part of the assistance data to the network device.

Specifically, the server sends the assistance data according to configurations of the network device. If the network device gives only some configurations in the second message, the server may send a part of the assistance data, and the server may send the part of the assistance data to the network device according to the second message.

For example, if the network device obtains priority information from the first message, the network device allocates a resource according to the priority information. Correspondingly, the server sends the assistance data to the network device according to the resource allocated by the network device. If the network device does not obtain the priority information from the first message, and the network device cannot allocate sufficient resources for assistance data transmission, the network device may send, to the server, a resource that can be allocated, for example, may add configuration information such as TBSs and transmission cycles of several SIBs to the second message. After receiving the second message, the server determines a specific type of assistance data to be transmitted, and correspondingly transmits the assistance data.

It should be understood that a specific procedure in which the server sends all or the part of the assistance data to the network device is the same as the specific procedure in (1). For brevity, details are not described herein again.

Optionally, the second message is used to indicate that the network device does not support broadcasting of the positioning assistance data, and the server does not send positioning assistance data to the network device according to the second message.

Specifically, when the network device does not support broadcasting of the assistance data due to a resource limitation or another reason, the network device sends a second message to the server, where the second message is used to indicate that the network device does not support broadcasting of the assistance data. In this case, after receiving the second message, the server does not send the assistance data to the network device.

Optionally, the second message is used to indicate that the network device does not support broadcasting of the assistance data in the first time period, and the method 200 further includes:

after receiving the second message, sending, by the server, the assistance data to the network device after the first time period.

Specifically, when the server sends a part of the assistance data to the network device, or when the server does not send the assistance data to the network device, the server may obtain, from the second message, a reason why the network device does not support broadcasting and/or the first time period for which the server needs to wait. In this case, when receiving the second message, the server may wait for the first time period and send the assistance data to the network device.

Optionally, the first message in S210 may not indicate that the assistance data is of a GNSS type. Instead, when the assistance data is transmitted in S230, the network device is indicated, by using, for example, a GNSS ID, that the assistance data is of the GNSS type.

Optionally, when the server sends all or the part of the assistance data to the network device, data of an encryption key may further be carried. After receiving the data of the encryption key, the network device transparently transmits the data of the encryption key to the terminal device. Specifically, the data of the encryption key may be sent together with data of each data type, or only one or more pieces of data of the encryption key may be sent. If one piece of data of the encryption key is sent, it indicates that the key is used for all data encryption. If each type has one piece of encryption key data, the encryption key is used only for decryption of this data type. The encryption key may alternatively be represented as security information.

It should be understood that the server may cyclically send the assistance data to the network device, and the server may carry the cycle information when sending the data.

S240. The network device sends all or the part of the assistance data to the terminal device.

Specifically, in S230, after the network device receives all or the part of the assistance data sent by the server, the network device adds the assistance data to the first system message and broadcasts the first system message to the terminal device.

Optionally, the method 200 further includes:

sending, by the terminal device, a second request message to the server; and receiving, by the server, the second request message sent by the terminal device, where the second request message is used to request unsuccessfully received assistance data in the assistance data; and sending, by the server, the unsuccessfully received assistance data in the assistance data to the terminal device according to the second request message.

Specifically, when the server sends a part of the assistance data to the network device, or when the server does not send the assistance data to the network device, the server may send, in unicast mode, remaining assistance data to a terminal device requiring the assistance data. The terminal device may request the required assistance data in unicast, and then the server transmits the corresponding assistance data.

It should be understood that when finding that assistance data in a system message broadcast by the network device cannot meet a positioning requirement of the terminal device, the terminal device requests assistance data from the server in unicast mode.

S250. The terminal device determines a location of the terminal device according to all or the part of the assistance data.

It should be understood that the assistance data information obtained by the network device from the server may further carry information about a time parameter, and the assistance data sent by the network device to the terminal device may further carry the time parameter. For a definition of the time parameter, refer to definitions in other embodiments of the present invention.

It should be understood that the terminal device may further complete positioning measurement according to all or the part of the assistance data.

Specifically, the terminal device receives the assistance data sent by the network device, and calculates location information of the terminal device according to the assistance data. Alternatively, after receiving the part of the assistance data sent by the network device, the terminal device determines the location of the terminal device. When the network device cannot determine the location of the terminal device according to the part of the assistance data, the network device may request remaining assistance data from the server in unicast mode. After receiving the remaining assistance data sent by the server, the network device calculates the location information of the terminal device.

Optionally, when the server sends the assistance data to the terminal device in unicast mode, the assistance data may further carry data of an encryption key.

According to the transmission method in this embodiment of this application, the server and the network device perform negotiation and configuration in advance, and the server sends the configuration information and the priority information to the network device. When the resource of the network device is limited, the server may preferentially transmit assistance data with a higher priority.

In the method 200, the server delivers the configuration information and/or the priority information to the network device. When the resource of the network device is limited, the server may preferentially transmit assistance data with a higher priority. With reference to the method 300, the following describes delivering a time parameter and/or a repetition indication parameter by the server, to avoid that positioning accuracy is affected because the assistance data expires after the terminal device receives the assistance data.

Figure 3:
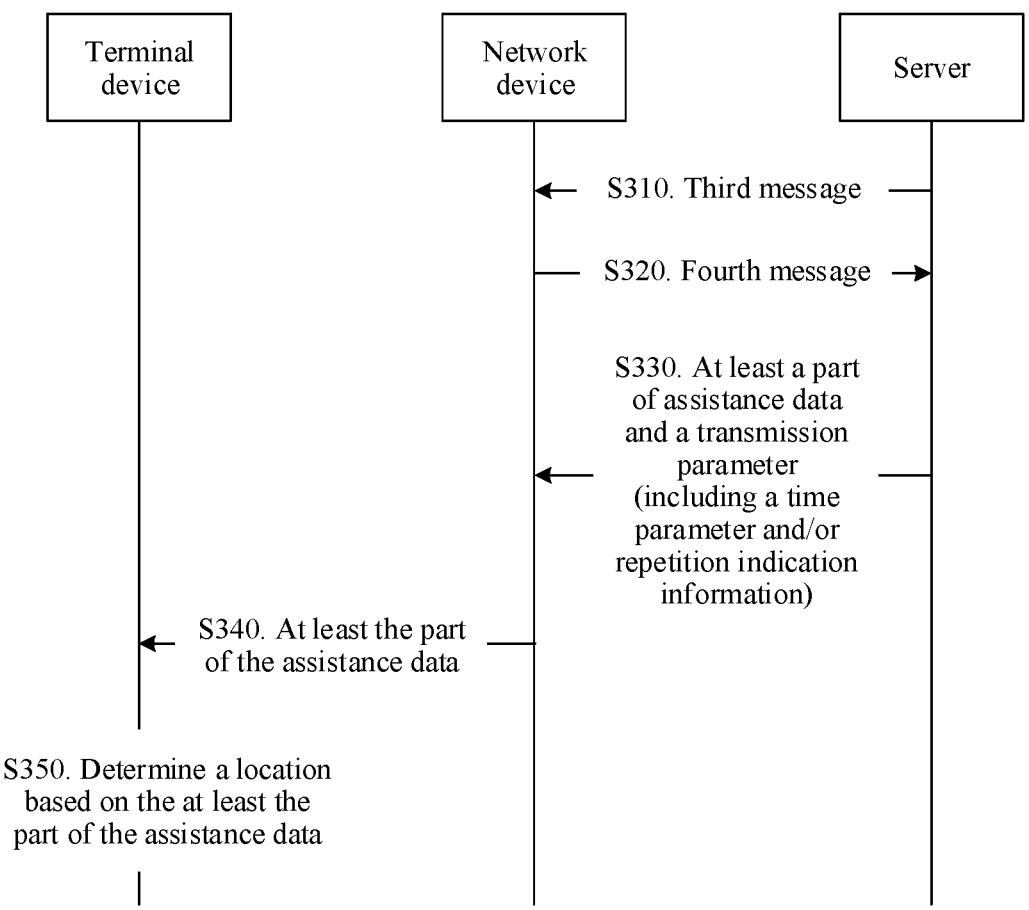
FIG. 3 is another schematic flowchart of a data transmission method according to an embodiment of this application.

FIG. 3 is a schematic flowchart of a transmission method 300 according to an embodiment of this application. As shown in FIG. 3, a server in FIG. 3 may correspond to the server 110 in FIG. 1, a network device in FIG. 3 may correspond to the network device 120 in FIG. 1, and a terminal device in FIG. 3 may correspond to the terminal device 130 in FIG. 1. The method 300 includes the following steps.

S310. The server sends a third message to the network device, and the network device receives the third message sent by the server, where the third message is used to request to broadcast assistance data, the third message includes a size of a data volume of the assistance data, and the assistance data is used by the terminal device to perform positioning.

Specifically, after obtaining the assistance data used by the terminal device to perform positioning, the server sends the third message to the network device, where the third message is used to request to broadcast the assistance data, the third message includes the size of the data volume of the assistance data, and the assistance data is used by the terminal device to perform positioning.

Optionally, before the server sends the third message to the network device, the method further includes:

sending, by the terminal device, a first request message to the server; and receiving, by the server, the first request message sent by the terminal device, where the first request message is used to request to obtain the assistance data through broadcasting.

For example, the first request message may be LTE positioning protocol (LPP) signaling, and a broadcast request field or another field may be added to the LPP signaling. A signaling name may be a providing capability, or may be other signaling.

S320. The network device sends a fourth message to the server in response to the third message, and the server receives the fourth message sent by the network device, where the fourth message includes a transmission cycle of a second system message and a size of a data volume that can be carried in the second system message.

Specifically, after receiving the third message sent by the server, the network device determines the size of the data volume of the assistance data, and sends the fourth message to the server according to the third message, where the fourth message includes the transmission cycle of the second system message and the size of the data volume that can be carried in the second system message.

It should be understood that the "second system message" in this embodiment of this application does not limit a quantity of system messages. The second system message may be one system message, or may be a plurality of system messages. This is not limited in this embodiment of this application.

It should be further understood that the process of S210 before the network device sends the second message may alternatively not exist. For example, when a resource of the network device changes or at another moment, the network device may actively send a configuration update message to the server, where the configuration update message carries configuration information of a current system message of the network device, for example, a transmission cycle of the current system message and a size of a data volume that can be carried in the current system message.

For example, the server adds, to the third message, the size of the data volume of the assistance data, where the size of the data volume of the assistance data is 100 M. After receiving the third message, the network device may determine, according to the size of the data volume of the assistance data, to configure a transmission cycle and a size of a SIB 1 as 100 ms and 100 bytes respectively, and send configuration information of the SIB 1 to the server by using the fourth message.

S330. The server sends the assistance data and a transmission parameter to the network device according to the fourth message, where the transmission parameter includes a time parameter and/or a repetition indication parameter of each data type in the assistance data.

Optionally, the server sends data type information to the network device. The data type information further includes a second transmission parameter corresponding to the data type. The second transmission parameter includes a time parameter or a repetition indication parameter corresponding to the data type. The time parameter is used to indicate expiration time information of assistance data corresponding to the data type. The repetition indication parameter is used to indicate that the assistance data corresponding to the data type needs to be repeatedly sent or indicate a quantity of times that the assistance data corresponding to the data type needs to be repeatedly sent.

Specifically, the server may segment the assistance data according to the size, carried in the fourth message, of the data volume that can be carried in the second system message, and send the segmented assistance data to the network device. In addition, the server indicates the time parameter and/or the repetition indication parameter of each data type in the assistance data to the network device.

The time parameter may specifically include at least one of an expiration time, a latency parameter, an overflow time, and a real-time time. The expiration time indicates expiration time information of assistance data of a data type or expiration time information of assistance data in a SIB. The latency parameter and the overflow time also have a similar meaning, that is, data becomes invalid or precision deteriorates after an allowed latency length and the time overflow. The real-time time indicates a current time at which the assistance data is sent. The time parameter may correspond to a specific data type.

It should be understood that, in this embodiment of this application, the expiration time information may be used to indicate an expiration time length or an invalid time length of the assistance data corresponding to the data type.

The repetition indication parameter is used to indicate whether assistance data of a data type or assistance data in a SIB can be repeatedly sent. The repetition indication parameter may represent an information element or a field, and is used to indicate whether repeated sending is required; or may indicate a quantity of repetitions and/or a repetition cycle, or the like. The quantity of repetitions may be used to indicate a quantity of times of repeatedly sending the data. The repetition cycle indicates a cycle for repetition of the assistance data. After receiving the indication, the network device may repeatedly send assistance data of a corresponding data type or assistance data in a SIB.

It should be understood that, if the network device does not receive a displayed priority indication, it may be considered that the server sequentially decreases or increases priorities in a sequence indicated in a list of requested configurations, that is, the first information requested to be configured may have a highest priority (or a lowest priority), and the rest may be deduced by analogy. When network device resources are limited, some resources may be preferentially configured according to the information.

Optionally, when the fourth message is used to indicate that broadcasting of the assistance data is not supported temporarily or when a configuration failure or a failure message is returned, the fourth message further includes a reason why broadcasting is not supported and/or a first waiting time period. In this case, when receiving the fourth message, the server may wait for the first time period and send the assistance data to the network device.

It should be understood that the time parameter and/or the repetition indication parameter may be sent to the network device when the server sends the assistance data in S330, or may be added to the third message in S310. This is not limited in this application.

S340. The network device sends all or a part of the assistance data to the terminal device according to the transmission parameter.

Specifically, the network device may broadcast the assistance data in a segmented form. That is, assistance data of a data type or assistance data of a system message is sent in a segmented form.

Optionally, the network device may further indicate, to the terminal device, information such as a segment sequence number, whether a data segment is the last packet, a remaining expiration time of the data segment, and whether repeated sending needs to be performed.

For example, when the network device receives assistance data of a data type or assistance data and a time parameter of a SIB from the server, possible operations of the network device include the following two aspects:

(1) If the time parameter may be represented as a discard timer (Discard Timer), that is, a value of the time parameter is a maximum value of the timer. After receiving the assistance data, the network device may start the discard timer.

Optionally, when broadcasting each data segment or data packet, the network device may determine, according to the discard timer, whether a current data packet is valid; and if the current data packet is valid, broadcast the current data packet to the terminal device. If the network device determines that the data packet is invalid (where for example, a validity period of the data packet has expired when the data packet is sent), the network device may not broadcast the data packet (that is, the location is not broadcast), or broadcast an invalid packet indication, or broadcast an invalid packet indication and the data packet, or broadcast an invalid packet indication, the data packet, and the validity period. When receiving any one of the foregoing indications, the terminal device considers that the data packet is invalid, or precision of using the data packet may deteriorate. The terminal device may discard the packet. Certainly, the terminal device may alternatively still use the packet. The method is mainly applicable to a scenario in which the terminal device can independently process each data packet.

Optionally, when receiving each data segment or data packet sent by the server, the network device may start the discard timer for each data packet, the last data packet, or the last several data packets (or the last several data segments). When it is found that a data packet times out, at a moment of sending the data packet to the terminal device, the network device may send an empty data packet, or an invalid data packet indication, or the data packet and an invalid data packet indication, or the data packet, an invalid data packet indication, and a remaining expiration time. After receiving these indications, the terminal device may use a manner the same as a previous data packet processing manner, or may discard all previously received data packets associated with the data packet. To be specific, if assistance data of a data type is divided into 10 segments, and a timeout occurs in the fifth segment, the terminal device may discard all four previously received data segments. Such manner is mainly applicable to a scenario in which the terminal device finishes receiving all data packets, that is, has received all data packets for processing.

Optionally, the network device may add an expiration time to each broadcast data segment or data packet, to indicate that the data packet is valid in the time period. After receiving the data packet, the terminal device may perform processing, for example, determine, according to the expiration time of the data packet, whether to use the data packet.

It should be understood that assistance data of different data types may correspond to different expiration time lengths (discard timer duration), or may correspond to a same expiration time length, and segments or expiration time lengths of data packets of a same data type are the same.

(2) The time parameter may be represented as a latency parameter. After receiving the assistance data, the network device determines, according to implementation, whether each data packet is to become invalid. If the data packet is invalid, the network device does not send the data packet, or sends an invalid packet indication. This is similar to the foregoing manner.

Specifically, when the network device receives assistance data of a data type or a plurality of segments or a plurality of data packets of assistance data in a SIB, if the network device determines that a data packet (data segment) in the data packet is to become invalid, the network device may not broadcast any data packet belonging to the data segment list, or may send an invalid packet indication, or may send an invalid packet indication together with a data packet and/or timeout latency.

It should be understood that the invalidity herein indicates that the data packet (data segment) has expired or exceeded a specific time of the time parameter.

It should be further understood that, in S330, the server indicates the repetition indication parameter of each data type in the assistance data to the network device, where the repetition indication parameter includes assistance data of a data type or a repetition cycle and/or a quantity of repetitions for which assistance data in a SIB is repeatedly sent to the terminal device. In this case, when sending assistance data of a data type to the terminal device, the network device repeatedly sends segments or data packets of assistance data of a data type to the terminal device according to the repetition indication parameter.

Optionally, the method 300 further includes:

sending, by the terminal device, a second request message to the server; and receiving, by the server, the second request message sent by the terminal device, where the second request message is used to request unsuccessfully received assistance data in the assistance data; and sending, by the server, the unsuccessfully received assistance data in the assistance data to the terminal device according to the second request message.

Specifically, when the server sends a part of the assistance data to the network device, or when the server does not send the assistance data to the network device, the server may send, in unicast mode, remaining assistance data to a terminal device requiring the assistance data. The terminal device may request the required assistance data in unicast, and then the server transmits the corresponding assistance data.

It should be understood that when finding that assistance data in a system message broadcast by the network device cannot meet a positioning requirement of the terminal device, the terminal device requests assistance data from the server in unicast mode.

S350. The terminal device determines a location of the terminal device according to the assistance data.

Specifically, the terminal device receives the assistance data sent by the network device, and calculates location information of the terminal device according to the assistance data.

It should be further understood that the assistance data is limited by a TBS of the SIB, and may be transmitted in different segmentation manners. There are two manners for processing the assistance data on a terminal device side.

Manner 1: The terminal device calculates all data segments that belong to a large data packet, and then deciphers and processes the assistance data.

For the manner 1, the terminal device needs to learn an indication of a last data segment, so that the terminal device can learn when to start processing all data segments received before.

Manner 2: The terminal device may independently decipher and process each data segment.

For the manner 2, the terminal device does not need to consider segmentation information of the assistance data when processing the assistance data.

According to the transmission method in this embodiment of this application, the server and the network device perform negotiation and configuration in advance, and the server sends the time parameter and the repetition indication parameter to the network device, so that the network device determines whether the assistance data is valid for the terminal device.

In the method 200, when the transmission parameter includes the configuration information and/or the priority information, optimization on the entire assistance data transmission procedure is described. In the method 300, when the transmission parameter includes the time parameter and/or the repetition indication parameter, optimization on the entire assistance data transmission procedure is described. The following describes, with reference to a method 400, optimization on the entire assistance data transmission procedure when the transmission parameter includes at least one of the configuration information, the priority information, the time parameter, and the repetition indication parameter.

Figure 4:
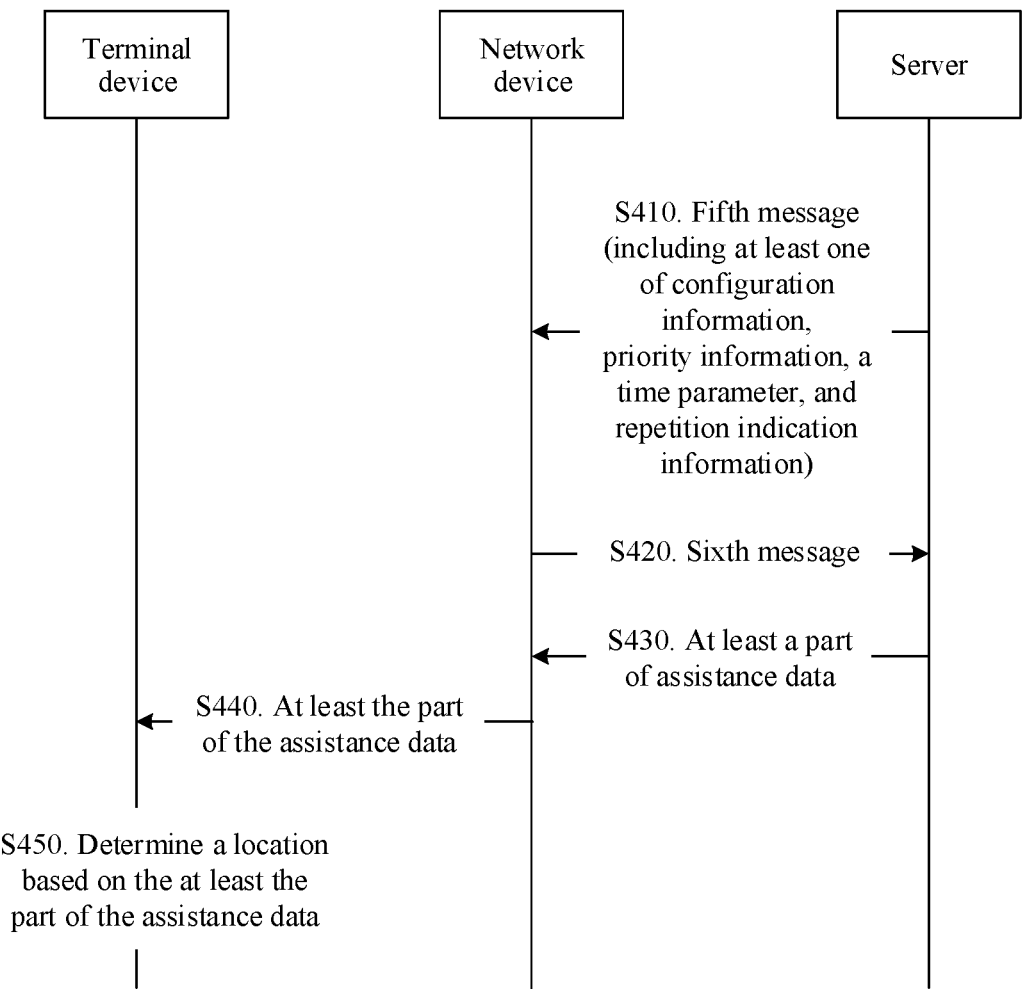
FIG. 4 is still another schematic flowchart of a data transmission method according to an embodiment of this application.

FIG. 4 is a schematic flowchart of a transmission method 400 according to an embodiment of this application. As shown in FIG. 4, a server in FIG. 4 may correspond to the server 110 in FIG. 1, a network device in FIG. 4 may correspond to the network device 120 in FIG. 1, and a terminal device in FIG. 4 may correspond to the terminal device 130 in FIG. 1. The method 400 includes the following steps.

S410. The server sends a fifth message to the network device, and the network device receives the fifth message sent by the server, where the fifth message is used to request to broadcast assistance data, the fifth message includes a transmission parameter, and the transmission parameter includes at least one of configuration information, priority information, a time parameter, and a repetition indication parameter.

It should be understood that content and functions of the configuration information and the priority information are the same as those of the configuration information and the priority information in the method 200. For brevity, details are not described herein again.

It should be further understood that content and functions of the time parameter and the repetition indication parameter are the same as those of the time parameter and the repetition indication parameter in the method 300. For brevity, details are not described herein again.

Optionally, before the server sends the fifth message to the network device, the method further includes:

sending, by the terminal device, a first request message to the server; and receiving, by the server, the first request message sent by the terminal device, where the first request message is used to request to obtain the assistance data through broadcasting.

For example, the first request message may be LTE positioning protocol (LPP) signaling, and a broadcast request field or another field may be added to the LPP signaling. A signaling name may be a providing capability, or may be other signaling.

S420. The network device sends a sixth message to the server in response to the fifth message, where the sixth message includes a transmission cycle of a third system message and a size of a data volume that can be carried in the third system message.

It should be understood that if the fifth message includes the configuration information and/or the priority information, the network device may send the sixth message to the server according to the fifth message. The sixth message includes the transmission cycle of the third system message and the size of the data volume that can be carried in the third system message, and the one or more system messages include the third system message; or the sixth message is used to indicate that the network device does not support broadcasting of the positioning assistance data. The process herein is similar to that of S220. For brevity, details are not described herein again.

It should be further understood that if the fifth message does not carry the configuration information and/or the priority information, this case is similar to a process of S320. For brevity, details are not described herein again.

It should be further understood that the "third system message" in this embodiment of this application does not limit a quantity of system messages. The third system message may be one system message, or may be a plurality of system messages. This is not limited in this embodiment of this application.

It should be further understood that the process of S410 before the network device sends the second message may alternatively not exist. For example, when a resource of the network device changes or at another moment, the network device may actively send a configuration update message to the server, where the configuration update message carries configuration information of a current system message of the network device, for example, a transmission cycle of the current system message and a size of a data volume that can be carried in the current system message.

It should be further understood that, if the network device does not receive a displayed priority indication, it may be considered that the server sequentially decreases or increases priorities in a sequence indicated in a list of requested configurations, that is, the first information requested to be configured may have a highest priority (or a lowest priority), and the rest may be deduced by analogy. When network device resources are limited, some resources may be preferentially configured according to the information.

Optionally, when the sixth message is used to indicate that broadcasting of the assistance data is not supported temporarily or when a configuration failure or a failure message is returned, the sixth message further includes a reason why broadcasting is not supported and/or a first waiting time period. In this case, when receiving the sixth message, the server may wait for the first time period and send the assistance data to the network device.

S430. The server sends all or the part of the assistance data to the network device according to the sixth message.

It should be understood that if the fifth message includes the configuration information and/or the priority information, the network device sends the sixth message to the server according to the fifth message. The server determines to send all or a part of the assistance data according to the size, carried in the sixth message, of the data volume that can be carried in the third system message. When the one or more system messages include the third system message, a process in which the server sends all or a part of the assistance data to the network device is similar to that of S230. For brevity, details are not described herein again.

It should be further understood that, if the fifth message does not carry the configuration information and/or the priority information, the process in which the network device sends the sixth message to the server according to the fifth message is similar to that of S330. For brevity, details are not described herein again.

It should be understood that the fifth message in S410 may not carry the time parameter and/or the priority information, but the server sends the time parameter and/or the priority information to the network device when sending all or a part of the assistance data to the network device in S430.

It should be understood that the server may cyclically send the assistance data to the network device, and the server may carry the cycle information when sending the data.

S440. The network device sends all or the part of the assistance data to the terminal device.

It should be understood that, if the transmission parameter received by the network device in S410 includes the time parameter and/or the repetition indication parameter, or the network device also receives the time parameter and/or the repetition indication parameter included in the transmission parameter when receiving all or the part of the assistance data in S430, a process of S440 is similar to a process of S340. For brevity, details are not described herein again.

S450. The terminal device determines a location of the terminal device according to all or the part of the assistance data.

Specifically, the terminal device receives the assistance data sent by the network device, and calculates location information of the terminal device according to the assistance data. Alternatively, if the terminal device cannot determine the location of the terminal device after receiving the part of the assistance data sent by the network device, the terminal device may request remaining assistance data from the server in unicast mode. After receiving the remaining assistance data sent by the server, the terminal device calculates the location of the terminal device.

According to the transmission method in this embodiment of this application, the server and the network device perform negotiation and configuration in advance, and the server sends the configuration information, the priority information, the time parameter, and the repetition indication parameter to the network device. When a resource of the network device is limited, the server may preferentially transmit assistance data with a higher priority. This helps the network device determine whether the assistance data is valid for the terminal device.

According to the data transmission method in this embodiment of this application, there are three cases in a transmission process of assistance data.

In a first case, the server sends all the assistance data to the network device for broadcasting.

For the first case, the server and the network device may negotiate a radio resource in advance, and then the server segments the assistance data and sends the segmented assistance data to the network device. After obtaining the segmented assistance data, the network device cyclically sends the segmented assistance data to the terminal device by adding the segmented assistance data to a particular SIB.

In a second case, the server can send only a part of the assistance data to the network device for broadcasting.

For the second case, a part of assistance data cannot be sent to the network device for broadcasting. In this case, there are two solutions to support transmission of the remaining assistance data.

Solution 1: When the terminal device receives only a part of the assistance data from the system message, but the part of the assistance data cannot meet a positioning requirement of the terminal device, the terminal device may directly request the server, in unicast mode, for the assistance data required by the terminal device, to perform positioning.

Solution 2: The server may attempt to broadcast the remaining assistance data again. When the network device indicates that only a part of the assistance data can be broadcast, the server may wait for a period of time and then attempt to send the remaining assistance data again.

In a third case, the network device indicates that the server does not support broadcasting of the assistance data.

For the third case, solutions are the same as those to the second case.

The foregoing describes the three transmission methods in the embodiments of this application with reference to FIG. 2 to FIG. 4. In the three transmission methods, before sending the assistance data to the network device, the server needs to negotiate, with the network device, information such as configurations between the server and the network device in advance. The following describes, with reference to FIG. 5 and FIG. 6, a case in which the server directly sends the assistance data to the network device after obtaining the assistance data.

Figure 5:
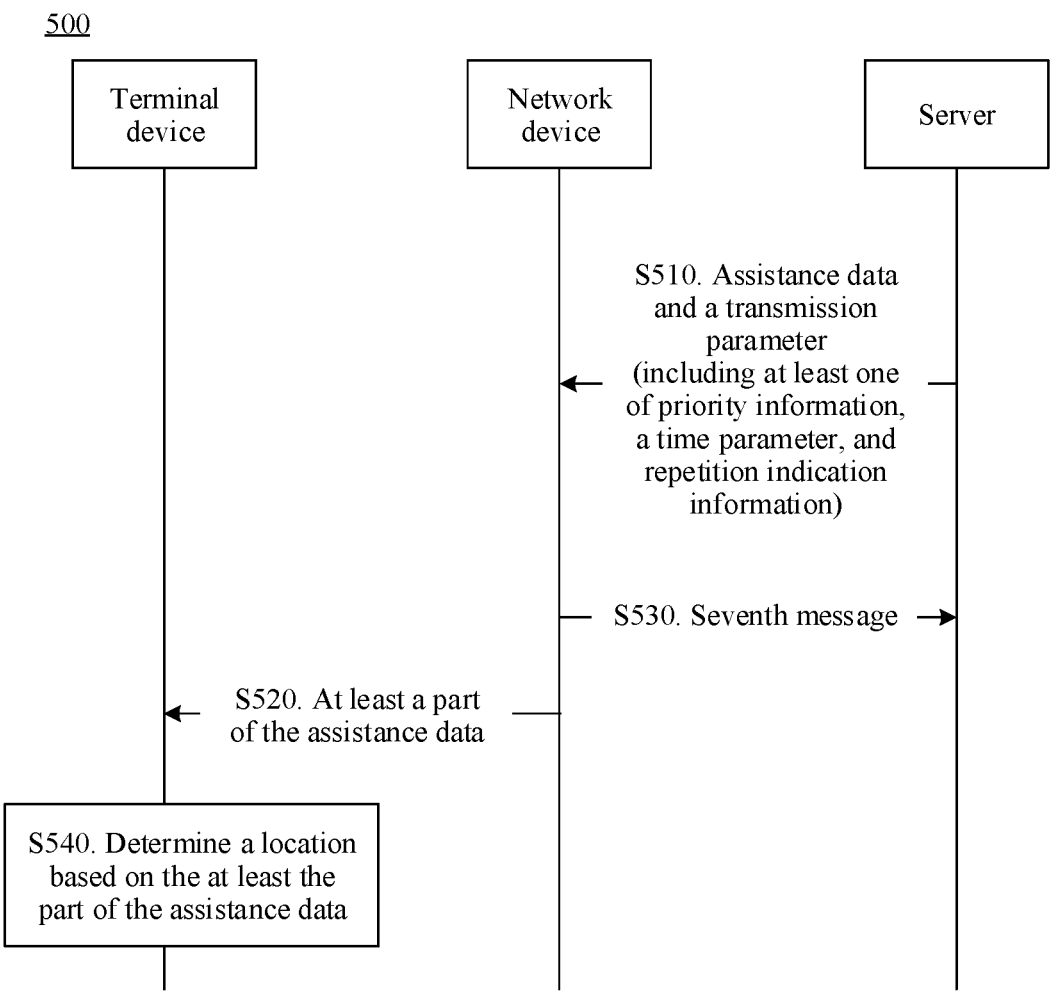
FIG. 5 is still another schematic flowchart of a data transmission method according to an embodiment of this application.

FIG. 5 is a schematic flowchart of a transmission method 500 according to an embodiment of this application. As shown in FIG. 5, a server in FIG. 5 may correspond to the server 110 in FIG. 1, a network device in FIG. 5 may correspond to the network device 120 in FIG. 1, and a terminal device in FIG. 5 may correspond to the terminal device 130 in FIG. 1. The method 500 includes the following steps.

S510. The server sends, to the network device, assistance data and a transmission parameter that is used to transmit the assistance data, and the network device receives the assistance data and the transmission parameter that is used to transmit the assistance data that are sent by the server, where the transmission parameter includes at least one of priority information, a time parameter, and a repetition indication parameter.

Specifically, after obtaining the assistance data used by the terminal device to perform positioning, the server segments the assistance data of different data types and sends the segmented assistance data to the network device, and sends, to the network device, a transmission parameter used to transmit the assistance data. The transmission parameter includes at least one of the priority information, the time parameter, and the repetition indication parameter.

The priority information is used to indicate priorities of different data types in the assistance data.

The time parameter may specifically include at least one of an expiration time, a latency parameter, an overflow time, and a real-time time. The expiration time indicates an expiration time length of assistance data of a data type or an expiration time length of assistance data in a SIB. The latency parameter and the overflow time also have a similar meaning, that is, data becomes invalid or precision deteriorates after an allowed latency length and the time overflow. The real-time time indicates a current time at which the assistance data is sent.

The repetition indication parameter is used to indicate whether assistance data of a data type or assistance data in a SIB can be repeatedly sent. The repetition indication parameter may represent an information element or a field, and is used to indicate whether repeated sending is required; or may indicate a quantity of repetitions and/or a repetition cycle, or the like. After receiving the indication, the network device may repeatedly send assistance data of a corresponding data type or assistance data in a SIB.

It should be understood that there is no actual sequence for sending the transmission parameter and the assistance data by the server in S510. The server may send the transmission parameter to the network device before sending the assistance data, or send the transmission parameter to the network device while sending the assistance data, or send the transmission parameter to the network device after sending the assistance data.

S520. The network device sends all or a part of the assistance data to the terminal device according to the transmission parameter, and the terminal device receives all or the part of the assistance data sent by the network device.

Specifically, when receiving the assistance data and the transmission parameter, the network device sends all or the part of the assistance data to the terminal device according to the transmission parameter.

For example, when receiving data segments or data packets and priority information of a data type 1 (transmitted in a SIB 1), a data type 2 (transmitted in a SIB 2), and a data type 3 (transmitted in a SIB 3) that are sent by the server, the network device determines that the priority information indicates that a priority of the data type 1 is 1, a priority of the data type 2 is 2, and a priority of the data type 3 is 3. A larger number indicates a lower priority. The network device preferentially broadcasts, in the SIB 1, the assistance data of the data type 1 to the terminal device according to the priority information when a resource of the network device is limited or the network device is overloaded.

For another example, when receiving data segments or data packets and time parameters of a data type 1 (transmitted in a SIB 1), a data type 2 (transmitted in a SIB 2), and a data type 3 (transmitted in a SIB 3) that are sent by the server, the network device determines that an expiration time length of the data type 1 is, an expiration time length of the data type 2 is 1.5 s, and an expiration time length of the data type 3 is 2 s. When receiving a segment or a data packet of assistance data of each data type, the network device starts a discard timer. When sending assistance data of the data type 1, the data type 2, and the data type 3, the network device determines whether the segments or the data packets of the assistance data of the data types exceed duration of the discard timer. If the segments or the data packets exceed the duration of the discard timer, at a moment of sending the data packets to the terminal device, the network device may send an empty data packet, or an invalid packet indication, or the data packets and an invalid packet indication, or the data packets, an invalid packet indication, and a remaining expiration time.

For another example, when the network device receives data segments or data packets, priority information, and time parameters of a data type 1 (transmitted in a SIB 1), a data type 2 (transmitted in a SIB 2), and a data type 3 (transmitted in a SIB 3) that are sent by the server, the network device determines that the priority information indicates that a priority of the data type 1 is 1, a priority of the data type 2 is 2, and a priority of the data type 3 is 3. A larger number indicates a lower priority. The network device determines that an expiration time length of the data type 1 is, an expiration time length of the data type 2 is 1.5 s, and an expiration time length of the data type 3 is 2 s. In this case, the network device preferentially sends assistance data of the data type 1. When the network device starts to send assistance data of the data type 3, if determining that an expiration time length of the assistance data of the data type 3 exceeds 2 s, the network device may send an empty data packet or an invalid packet indication, or a data packet and an invalid packet indication of the assistance data of the data type 3.

For another example, when receiving data segments or data packets and repetition indication parameters of a data type 1 (transmitted in a SIB 1), a data type 2 (transmitted in a SIB 2), and a data type 3 (transmitted in a SIB 3) that are sent by the server, the network device determines a cycle and/or a quantity of times of repeated sending of assistance data of each data type, and sends assistance data of each data type to the terminal device according to the repetition indication parameter.

It should be understood that, in the prior art, after receiving assistance data sent by the server, the network device determines a priority of each data type in the assistance data, and sends the assistance data to the terminal device. In this embodiment of this application, the priority information is configured by the server, and the network device can more effectively send data with a higher priority to the terminal device.

It should be understood that, if the network device does not receive a displayed priority indication, it may be considered that the server sequentially decreases or increases priorities in a sequence indicated in a list of requested configurations, that is, the first information requested to be configured may have a highest priority (or a lowest priority), and the rest may be deduced by analogy. When network device resources are limited, some resources may be preferentially configured according to the information.

It should be understood that for equivalent priority configurations, the network device may configure equivalent data volumes.

Optionally, when the fourth message is used to indicate that broadcasting of the assistance data is not supported temporarily or when a configuration failure or a failure message is returned, the fourth message further includes a reason why broadcasting is not supported and/or a first waiting time period. In this case, when receiving the fourth message, the server may wait for the first time period and send the assistance data to the network device.

Optionally, the method 500 further includes the following steps.

S530. The network device sends a seventh message to the server, where the seventh message is used to indicate unsuccessfully sent assistance data in the assistance data.

It should be understood that S530 may be performed before S520.

Optionally, the network device sends a failure indication message to the server. For a specific procedure and behavior of the network device and the server, refer to S220. For brevity, details are not described herein again.

It should be further understood that the seventh message may further include configuration information of the current network device. For example, the seventh message includes a transmission cycle of the current system message and a size of a data volume that can be carried in the current system message. Understanding of the configuration information may also be similar to that in other embodiments in this specification.

It should be further understood that processes of S510 and/or S520 before the network device sends the seventh message may alternatively not exist. For example, when a resource of the network device changes or at another moment, the network device may actively send a configuration update message to the server, where the configuration update message carries configuration information of the current system message of the network device, for example, the transmission cycle of the current system message and the size of the data volume that can be carried in the current system message.

It should be further understood that a sequence of S520 and S530 is not limited.

S540. The terminal device determines a location of the terminal device according to all or the part of the assistance data.

Specifically, the terminal device receives all or the part of the assistance data sent by the network device, and calculates location information of the terminal device according to all or the part of the assistance data. Alternatively, if the terminal device cannot determine the location of the terminal device after receiving the part of the assistance data sent by the network device, the terminal device may request remaining assistance data from the server in unicast mode. After receiving the remaining assistance data sent by the server, the terminal device calculates the location of the terminal device.

Figure 6:
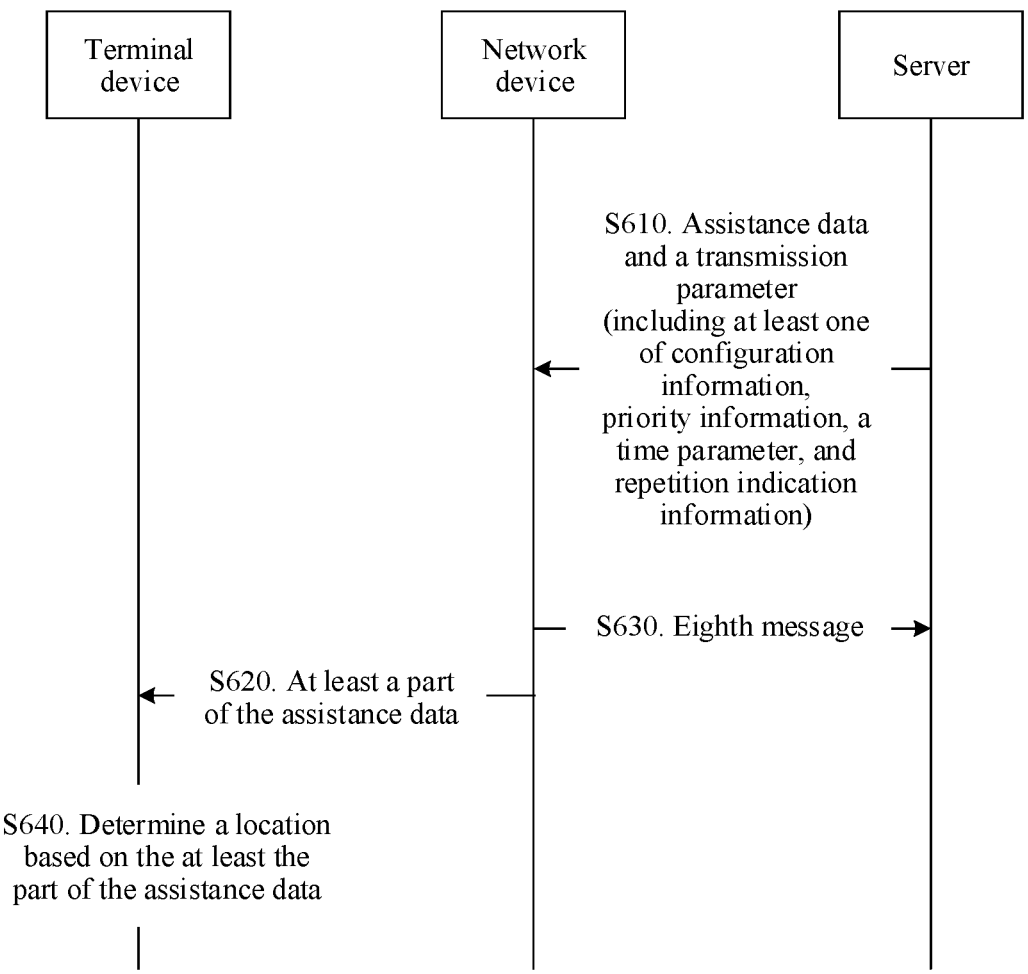
FIG. 6 is still another schematic flowchart of a data transmission method according to an embodiment of this application.

According to the transmission method in this embodiment of this application, while transmitting the assistance data, the server notifies the network device of the transmission parameter used to transmit the assistance data. This helps the network device preferentially send assistance data with a higher priority to the terminal device, and moreover, helps the network device determine whether the assistance data is valid for the terminal device. FIG. 6 is a schematic flowchart of a transmission method 600 according to an embodiment of this application. As shown in FIG. 6, a server in FIG. 6 may correspond to the server 110 in FIG. 1, a network device in FIG. 6 may correspond to the network device 120 in FIG. 1, and a terminal device in FIG. 6 may correspond to the terminal device 130 in FIG. 1. The method 600 includes the following steps.

S610. The server sends, to the network device, assistance data and a transmission parameter that is used to transmit the assistance data, and the network device receives the assistance data and the transmission parameter that is used to transmit the assistance data that are sent by the server, where the transmission parameter includes at least one of configuration information, priority information, a time parameter, and a repetition indication parameter.

Specifically, after obtaining the assistance data used by the terminal device to perform positioning, the server sends, to the network device, the assistance data and the transmission parameter that is used to transmit the assistance data. The transmission parameter includes at least one of the configuration information, the priority information, the time parameter, and the repetition indication parameter. The configuration information is used to request a transmission cycle of each of one or more system messages and/or a size of a data volume that can be carried in each of the one or more system messages. The one or more system messages are used to carry the assistance data.

Content and functions of the priority information, the time parameter, and the repetition indication parameter are the same as those in S510. For brevity, details are not described herein again.

S620. The network device sends all or a part of the assistance data to the terminal device.

It should be understood that if the transmission parameter in S610 includes at least one of the priority information, the time parameter, and the repetition indication parameter, a process of S620 is similar to that of S520. For brevity, details are not described herein again.

Optionally, the method 600 further includes the following steps.

S630. The network device sends an eighth message to the server, where the eighth message is used to indicate unsuccessfully sent assistance data in the assistance data.

It should be understood that if the transmission parameter in S610 includes the configuration information, the eighth message may further carry a transmission cycle of a fourth system message and/or a size of a data volume that can be carried in the fourth system message. The one or more system messages may include the fourth system message. The fourth system message may be a system message currently configured by the network device.

It should be further understood that a process of S610 before the network device sends the eighth message may alternatively not exist. For example, when a resource of the network device changes or at another moment, the network device may actively send a configuration update message to the server, where the configuration update message carries configuration information of a current system message of the network device, for example, a transmission cycle of the current system message and a size of a data volume that can be carried in the current system message.

It should be understood that, if the network device does not receive a displayed priority indication, it may be considered that the server sequentially decreases or increases priorities in a sequence indicated in a list of requested configurations, that is, the first information requested to be configured may have a highest priority (or a lowest priority), and the rest may be deduced by analogy. When network device resources are limited, some resources may be preferentially configured according to the information.

Optionally, when the eighth message is used to indicate that broadcasting of the assistance data is not supported temporarily or when a configuration failure or a failure message is returned, the eighth message further includes a reason why broadcasting is not supported and/or a first waiting time period. In this case, when receiving the eighth message, the server may wait for the first time period and send the assistance data to the network device.

It should be further understood that a sequence of S620 and S630 is not limited.

S640. The terminal device determines a location of the terminal device according to all or the part of the assistance data.

Specifically, the terminal device receives all or the part of the assistance data sent by the network device, and calculates location information of the terminal device according to all or the part of the assistance data. Alternatively, if the terminal device cannot determine the location of the terminal device after receiving the part of the assistance data sent by the network device, the terminal device may request remaining assistance data from the server in unicast mode. After receiving the remaining assistance data sent by the server, the terminal device calculates the location of the terminal device.

According to the transmission method in this embodiment of this application, while transmitting the assistance data, the server notifies the network device of the transmission parameter used to transmit the assistance data. This helps the network device preferentially send assistance data with a higher priority to the terminal device and determine whether the assistance data is valid for the terminal device. Moreover, the network device may feed back a current configuration of the network device to the server. This helps the server better transmit the assistance data to the network device.

Figure 7:
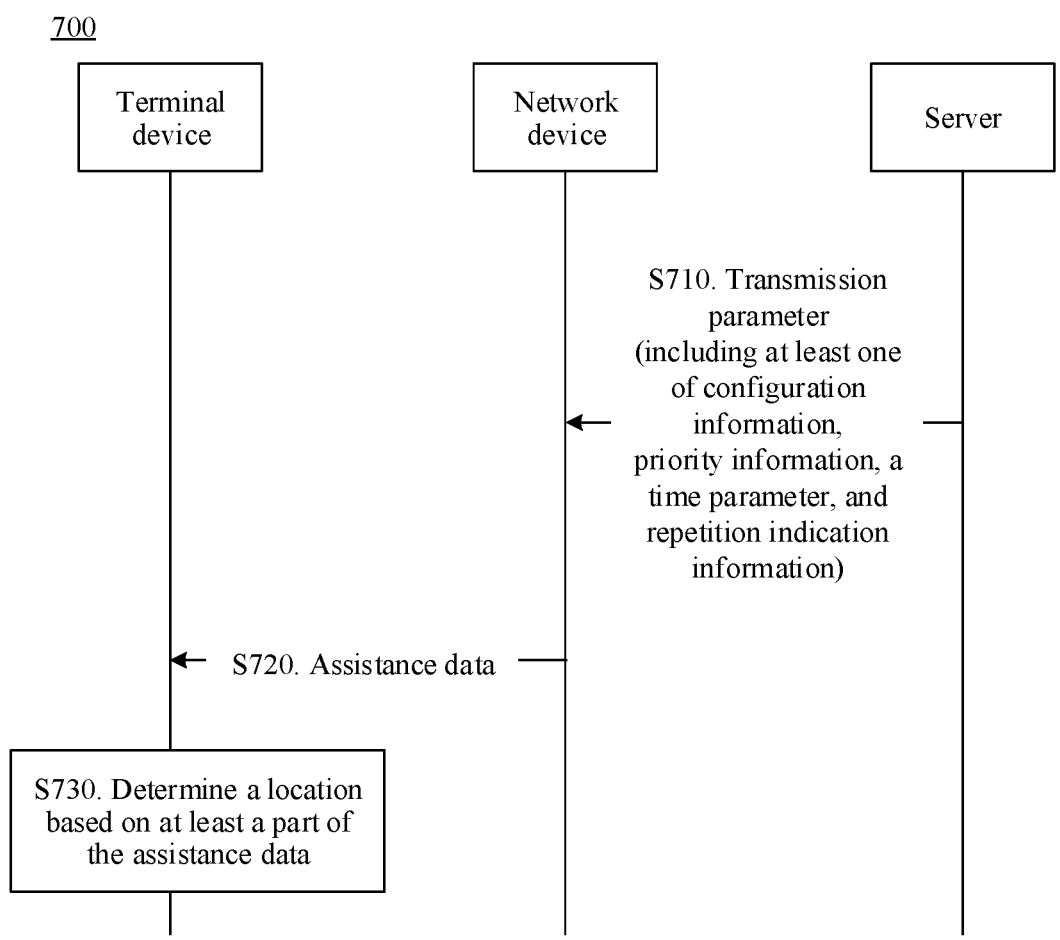
FIG. 7 is still another schematic flowchart of a data transmission method according to an embodiment of this application.

FIG. 7 is a schematic flowchart of a transmission method 700 according to an embodiment of this application. As shown in FIG. 7, a server in FIG. 7 may correspond to the server 110 in FIG. 1, a network device in FIG. 7 may correspond to the network device 120 in FIG. 1, and a terminal device in FIG. 7 may correspond to the terminal device 130 in FIG. 1. The method 700 includes the following steps.

S710. The server sends a transmission parameter to the network device, where the transmission parameter includes at least one of configuration information, priority information, a time parameter, and a repetition indication parameter.

Specifically, after obtaining the transmission parameter, where the terminal device determines that the transmission parameter is used to transmit assistance data, the server sends the transmission parameter to the network device. The transmission parameter includes at least one of the configuration information, the priority information, the time parameter, and the repetition indication parameter. The configuration information is used to request a transmission cycle of each of one or more system messages and/or a size of a data volume that can be carried in each of the one or more system messages. The one or more system messages are used to carry the assistance data.

Content and functions of the priority information, the time parameter, and the repetition indication parameter are the same as those in S510. For brevity, details are not described herein again.

It should be understood that, in the method 700, no limitation is imposed on when the server transmits the assistance data to the network device.

For example, when the network device is currently transmitting assistance data to the terminal device, the server sends the transmission parameter to the network device, and the network device sends remaining assistance data to the terminal device according to the transmission parameter.

For another example, before sending the assistance data to the network device, the server may send the transmission parameter to the network device, so that the network device broadcasts the assistance data to the terminal device according to the transmission parameter.

For still another example, the server may the transmission parameter to the network device after sending the assistance data to the network device.

It should be further understood that, in the method 700, no limitation is imposed on a configuration negotiated between the server and the network device before the network device broadcasts the assistance data.

S720. The network device sends the assistance data to the terminal device according to the transmission parameter.

S730. The terminal device determines a location of the terminal device according to the assistance data.

Specific message names in the embodiments of this specification may not be limited. For example, names of the first message, the third message, the fifth message, and the seventh message may be auxiliary information request messages; and names of the second message, the fourth message, the sixth message, and the eighth message may be auxiliary information response messages.

According to the embodiments in FIG. 2 to FIG. 7, the following provides some overviews of the solutions provided in this application from other perspectives. For some technical concepts and noun explanations in the following overview, refer to the embodiments in FIG. 2 to FIG. 7 for example descriptions.

Solution 1: The network side determines, according to a transmission configuration, a transmission configuration of a resource that can be used to transmit the assistance data.

The following describes the solution 1 from a perspective of a network device side.

The network device receives one or more transmission configurations from the server, where the transmission configuration includes a transmission cycle or a transport block size, and the transmission configuration is used to transmit assistance data; and the network device sends a first indication to the server, where the first indication is used to indicate a first transmission configuration, and the first transmission configuration is associated with the transmission configuration.

In an example, that the first transmission configuration is associated with the transmission configuration may be understood as that the first transmission configuration is determined according to the transmission configuration, or the first transmission configuration is selected from the one or more transmission configurations.

Optionally, the transmission configuration may further include a priority. The priority may be used as a reference factor for determining or selecting the first transmission configuration.

Optionally, the first indication may be an identifier of the first transmission configuration, or may be the transmission configuration. In other words, that the network device sends a first indication to the server may be understood as that the network device sends the identifier of the first transmission configuration to the server; or the network device sends the first transmission configuration to the server, where the first transmission configuration includes a first transmission cycle or a first transport block size.

It may be understood that the transmission cycle is used to indicate a cycle of transmitting assistance data, and the transport block size is used to indicate a data volume of assistance data transmitted once. Optionally, the transport block size may be understood as a maximum data volume of assistance data transmitted once, that is, the data volume of assistance data transmitted once may be less than or equal to the transport block size each time the assistance data is transmitted. It may be understood that the transport block size may be used as a segmentation basis of assistance data.

Optionally, the transmission configuration may be understood as a transmission configuration of a system message (for example, a SIB or SI), that is, the transmission configuration corresponds to the system message; or may be understood as transmission configuration of a data type of assistance data, that is, the transmission configuration corresponds to the data type. It may be understood that the correspondence between the transmission configuration and the system message or the assistance data may be specified in advance, or may be negotiated by the network device and the server.

Optionally, the network device may further receive, from the server, the assistance data corresponding to the transmission configuration. Optionally, a segment size of the corresponding assistance data meets the transport block size.

Optionally, the network device may further send, according to the first transmission configuration, assistance data corresponding to the first transmission configuration.

It may be understood that when the transmission configuration includes only the transmission cycle, the network device and the server may use a default transport block size. It may be understood that when the transmission configuration includes only the transport block size, the network device and the server may use a default transmission cycle. It may be understood that when the transmission configuration does not include a priority, a sequence of a plurality of transmission configurations may be used as a sequence of priorities. It may be understood that the priority is optional. To be specific, when the transmission configuration does not include the priority, the priority may not be considered.

The following describes the solution 1 from a perspective of a server side.

The server sends one or more transmission configurations to the network device, where the transmission configuration includes a transmission cycle or a transport block size, and the transmission configuration is used to transmit assistance data; and the server receives a first indication from the network device, where the first indication is used to indicate a first transmission configuration, and the first transmission configuration is associated with the transmission configuration.

Optionally, the server may further send assistance data corresponding to the first transmission configuration to the network device.

For explanations of related content of the solution 1 on the server side, refer to the content of the solution 1 described on the network device side. Details are not described herein again.

Solution 2: The network device determines, according to the transmission configuration, how to send assistance data corresponding to the transmission configuration.

The following describes the solution 2 from the perspective of the network device side.

The network device receives one or more transmission configurations from the server, where the transmission configuration includes a time parameter or a repetition indication parameter, the time parameter is used to indicate an expiration time of assistance data corresponding to the transmission configuration, and the repetition indication parameter is used to indicate that the assistance data corresponding to the transmission configuration needs to be repeatedly transmitted, a quantity of times that the assistance data needs to be repeatedly transmitted, or a maximum quantity of times that the assistance data needs to be repeatedly transmitted;

the network device receives, from the server, the assistance data corresponding to the first transmission configuration; and the network device sends, to the terminal according to the first transmission configuration, the assistance data corresponding to the first transmission configuration.

The first transmission configuration is associated with the one or more transmission configurations.

It may be understood that the one or more transmission configurations including the first transmission configuration may have the following meaning: The first transmission configuration is selected from the one or more transmission configurations, or the first transmission configuration is determined in the one or more transmission configurations.

Optionally, the one or more transmission configurations and the assistance data corresponding to the first transmission configuration may be carried in one message.

It may be understood that a function of the time parameter may be implemented in a plurality of manners, for example, by using a timer or a counter.

It may be understood that a maximum quantity of times that the assistance data corresponding to the transmission configuration needs to be repeatedly transmitted means that when the assistance data is sent to the terminal device, the quantity of times of repeated transmission may be less than or equal to the maximum quantity of times.

It may be understood that whether the assistance data is valid may be determined by using the time parameter. When the assistance data is invalid, the network device may notify the terminal device that the assistance data is invalid, or the network device discards the assistance data, or the network device may obtain new assistance data from the server.

Optionally, the transmission configuration may be understood as a transmission configuration of a system message (for example, a SIB or SI), that is, the transmission configuration corresponds to the system message; or may be understood as transmission configuration of a data type of assistance data, that is, the transmission configuration corresponds to the data type. It may be understood that the correspondence between the transmission configuration and the system message or the assistance data may be specified in advance, or may be negotiated by the network device and the server.

For content related to the solution 1, refer to the description of the solution 1. Details are not described herein again.

The following describes the solution 2 from the perspective of the server side.

The server sends one or more transmission configurations to the network device, where the transmission configuration includes a time parameter or a repetition indication parameter, the time parameter is used to indicate an expiration time of assistance data corresponding to the transmission configuration, and the repetition indication parameter is used to indicate that the assistance data corresponding to the transmission configuration needs to be repeatedly transmitted, a quantity of times that the assistance data needs to be repeatedly transmitted, or a maximum quantity of times of repeated transmission that the assistance data needs to be repeatedly transmitted; and the server sends the assistance data corresponding to the first transmission configuration to the network device.

The first transmission configuration is associated with the one or more transmission configurations.

It may be understood that the server may further receive a first indication from the network device, where the first indication is used to indicate the first transmission configuration.

For explanations of related content of the solution 2 on the server side, refer to the content of the solution 2 described on the network device side. Details are not described herein again.

Solution 3:

The solution 1 and the solution 2 may be combined. For example, the transmission configuration sent by the server to the network device may include the content of the transmission configuration in the solution 1 and the content of the transmission configuration in the solution 2. The network device may determine the first transmission configuration according to the content of the transmission configuration in the solution 1 in the transmission configuration, and then send, according to the content of the transmission configuration in the solution 2 in the first transmission configuration, the assistance data corresponding to the first transmission configuration.

The following provides an example description from the network device side.

The network device receives one or more transmission configurations from the server, where the transmission configuration includes:

a transmission cycle or a transport block size; and a time parameter or a repetition indication parameter, where the transmission configuration is used to transmit assistance data;

the network device sends a first indication to the server, where the first indication is used to indicate a first transmission configuration, and the first transmission configuration is associated with the transmission configuration;

the network device receives, from the server, the assistance data corresponding to the first transmission configuration; and the network device sends, to the terminal according to the first transmission configuration, the assistance data corresponding to the first transmission configuration.

The first transmission configuration is associated with the one or more transmission configurations.

Optionally, the network device may receive one or more transmission configurations from the server by performing receiving behavior for a plurality of times. For example, the network device receives one or more first-type transmission configurations from the server; and the network device receives one or more second-type transmission configurations from the server.

The first-type transmission configuration includes a transmission cycle or a transport block size, and the second-type transmission configuration includes a time parameter or a repetition indication parameter.

Optionally, the first-type transmission configuration or the second-type transmission configuration may be sent by the server to the network device together with the assistance data.

For explanations and descriptions of related content in the solution 3, refer to content in the solution 1 and the solution 2.

The following provides an example description from the server side.

The server sends one or more transmission configurations to the network device, where the transmission configuration includes:

a transmission cycle or a transport block size; and a time parameter or a repetition indication parameter, where the transmission configuration is used to transmit assistance data;

the server receives a first indication from the network device, where the first indication is used to indicate a first transmission configuration, and the first transmission configuration is associated with the transmission configuration; and the server sends the assistance data corresponding to the first transmission configuration to the network device.

The first transmission configuration is associated with the one or more transmission configurations.

For explanations and descriptions of related content in the solution 3, refer to content in the solution 1 and the solution 2.

Optionally, in the foregoing solutions, the terminal device may request to send the assistance data to the server.

In addition to the foregoing solutions, an embodiment of this application further provides an apparatus. The apparatus includes a processor and a memory. The memory stores a computer program instruction, and the processor is configured to execute the computer program instruction to implement the foregoing methods. In an example, the apparatus may be the network device, the server, or the terminal device in the foregoing solutions, or may be a chip or a chip system.

The foregoing describes in detail the data transmission methods according to the embodiments of this application with reference to FIG. 2 to FIG. 7. The following describes in detail a network device, a server, and a terminal device according to the embodiments of this application with reference to FIG. 8 to FIG. 17.

Figure 8:
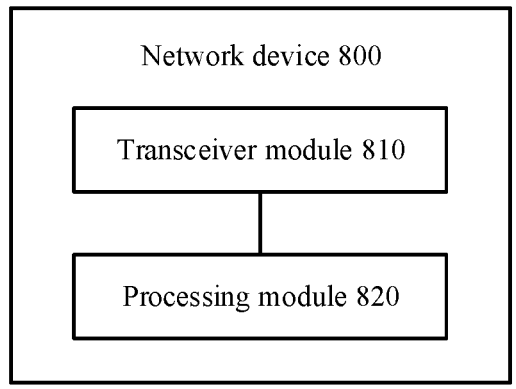
FIG. 8 is a schematic block diagram of a network device according to an embodiment of this application.

FIG. 8 is a schematic block diagram of a network device 800 according to an embodiment of this application. As shown in FIG. 8, the network device 800 includes:

a transceiver module 810, configured to receive a first transmission parameter that is sent by a server and that is used to transmit assistance data, where the first transmission parameter includes configuration information and/or priority information, the configuration information is used to request a transmission cycle of each of one or more system messages and/or a size of a data volume that can be carried in each of the one or more system messages, and the priority information is used to indicate a priority of each data type in the assistance data; and a processing module 820, configured to send a first message to the server according to the first transmission parameter, where the first message is used to indicate a transmission cycle of a first system message and a size of a data volume that can be carried in the first system message, and the one or more system messages include the first system message; or the first message is used to indicate that the network device does not support transmission of the assistance data.

According to the network device in this embodiment of this application, before sending the assistance data, the server negotiates with the network device. By receiving the configuration information and/or the priority information that is sent by the server and that is used to transmit the assistance data, the network device can more properly configure a resource used to transmit the assistance data.

Optionally, the transceiver module 810 is further configured to: receive all or a part of the assistance data sent by the server according to the first message; and send all or the part of the assistance data to a terminal device.

Optionally, the transceiver module 810 is further configured to receive a second transmission parameter that is sent by the server and that is used to transmit the assistance data, where the second transmission parameter includes a time parameter and/or a repetition indication parameter, the time parameter is used to indicate expiration time information of each data type in the assistance data, and the repetition indication parameter is used to indicate a data type that needs to be repeatedly sent in the assistance data.

The processing module 820 is specifically configured to:

control, according to the second transmission parameter, the transceiver module to send all or the part of the assistance data to the terminal device.

According to the network device in this embodiment of this application, before sending the assistance data, the server negotiates with the network device. By receiving the time parameter and/or the repetition indication parameter that is sent by the server and that is used to transmit the assistance data, validity of the assistance data is ensured, thereby improving positioning accuracy of the terminal device.

Optionally, if the network device fails to configure a parameter used to send the assistance data or cannot send the assistance data temporarily, the transceiver module 810 is further configured to send a first indication to the server, where the first indication is used to indicate that the server does not send all or a part of the assistance data to the network device in a first time period.

Optionally, the first message is used to indicate that the network device does not support transmission of the assistance data, the first message is further used to indicate a first time period for which the server needs to wait, and the transceiver module 810 is specifically configured to:

after sending the first message to the server, wait for the first time period, and receive all or a part of the assistance data sent by the server.

Figure 9:
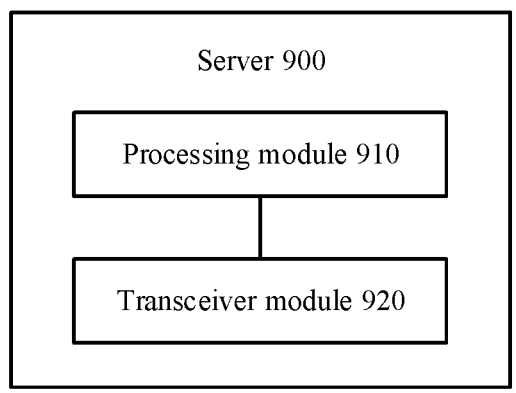
FIG. 9 is a schematic block diagram of a server according to an embodiment of this application.

FIG. 9 is a schematic block diagram of a server 900 according to an embodiment of this application. As shown in FIG. 9, the server 900 includes:

a processing module 910, configured to determine a first transmission parameter used to transmit assistance data, where the first transmission parameter includes configuration information and/or priority information, the configuration information is used to request a transmission cycle of each of one or more system messages and/or a size of a data volume that can be carried in each of the one or more system messages, and the priority information is used to indicate a priority of each data type in the assistance data; and a transceiver module 920, configured to send the first transmission parameter to a network device, where the transceiver module 920 is further configured to receive a first message sent by the network device according to the first transmission parameter, where the first message is used to indicate a transmission cycle of a first system message and a size of a data volume that can be carried in the first system message, and the one or more system messages include the first system message; or the first message is used to indicate that the network device does not support transmission of the assistance data.

According to the server in this embodiment of this application, before sending the assistance data, the server negotiates with the network device, and sends, to the network device, the configuration information and/or the priority information used to transmit the assistance data. This helps the network device more properly configure a resource used to transmit the assistance data.

Optionally, the transceiver module 920 is further configured to send, to the network device, a second transmission parameter used to transmit the assistance data, where the second transmission parameter includes a time parameter and/or a repetition indication parameter, the time parameter is used to indicate expiration time information of each data type in the assistance data, and the repetition indication parameter is used to indicate a data type that needs to be repeatedly sent in the assistance data.

According to the server in this embodiment of this application, before sending the assistance data, the server negotiates with the network device, and sends, to the network device, the time parameter and/or the repetition indication parameter used to transmit the assistance data. This helps ensure validity of the assistance data, thereby improving positioning accuracy of the terminal device.

Optionally, the processing module 910 is further configured to send all or a part of the assistance data to the network device according to the first message.

Optionally, if the network device fails to configure a parameter used to send the assistance data or cannot send the assistance data temporarily, the transceiver module 920 is further configured to receive a first indication sent by the network device, where the first indication is used to indicate that the server does not send all or a part of the assistance data to the network device in a first time period.

Optionally, the first message is used to indicate that the network device does not support transmission of the assistance data, the first message is further used to indicate the first time period for which the server needs to wait, and the processing module 910 is specifically configured to:

after receiving the first message sent by the server, wait for the first time period, and control the transceiver module to send all or the part of the assistance data to the network device.

According to the server in this embodiment of this application, the server negotiates with the network device before sending the assistance data, and a waiting time is added to the first message sent by the network device to the server. This helps the server determine a resource configuration status of the network device, so that the server can more properly deliver the assistance data to the network device.

Optionally, the transceiver module 920 is further configured to receive a second message sent by the terminal device, where the second message is used to request all or a part of the assistance data; and the processing module 910 is further configured to send all or the part of the assistance data to the terminal device according to the second message.

Figure 10:
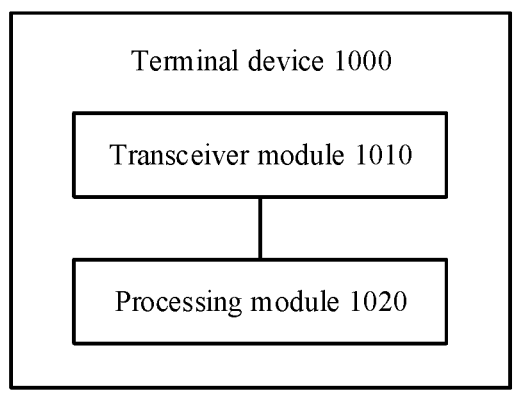
FIG. 10 is a schematic block diagram of a terminal device according to an embodiment of this application.

FIG. 10 is a schematic block diagram of a terminal device 1000 according to an embodiment of this application. As shown in FIG. 10, the terminal device 1000 includes:

a transceiver module 1010, configured to receive assistance data sent by a network device according to a transmission parameter, where the transmission parameter includes at least one of configuration information, priority information, a time parameter, and a repetition indication parameter, the configuration information is used to request a transmission cycle of each of one or more system messages and/or a size of a data volume that can be carried in each of the one or more system messages, the priority information is used to indicate a priority of each data type in the assistance data, the time parameter is used to indicate expiration time information of each data type in the assistance data, and the repetition indication parameter is used to indicate a data type that needs to be repeatedly sent in the assistance data; and a processing module 1020, configured to determine a location of the terminal device according to the assistance data.

In this embodiment of this application, the terminal device receives the assistance data sent by the network device according to the transmission parameter. This helps the terminal device improve positioning accuracy.

Optionally, the transceiver module 1010 is further configured to: send a first request message to a server, where the first request message is used to request to receive, through broadcasting, all or a part of the assistance data; and receive all or the part of the assistance data sent by the server according to the first request message.

Figure 11:
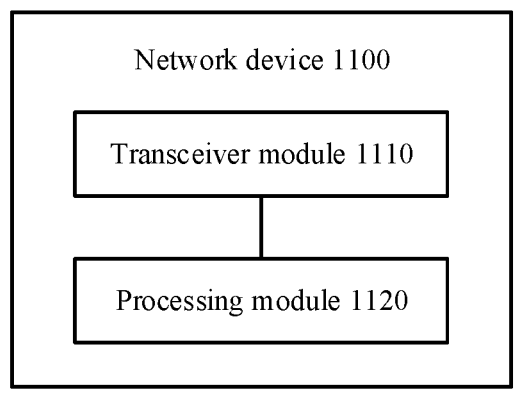
FIG. 11 is another schematic block diagram of a network device according to an embodiment of this application.

FIG. 11 is a schematic block diagram of a network device 1100 according to an embodiment of this application. As shown in FIG. 11, the network device 1100 includes:

a transceiver module 1110, configured to receive assistance data sent by a server and a third transmission parameter used to transmit the assistance data, where the third transmission parameter includes at least one of priority information, a time parameter, and a repetition indication parameter, the priority information is used to indicate a priority of each data type in the assistance data, the time parameter is used to indicate expiration time information of each data type in the assistance data, and the repetition indication parameter is used to indicate a data type that needs to be repeatedly sent in the assistance data; and a processing module 1120, configured to send all or a part of the assistance data to a terminal device according to the third transmission parameter.

Optionally, the third transmission parameter further includes configuration information, the configuration information is used to request a transmission cycle of each of one or more system messages and/or a size of a data volume that can be carried in each of the one or more system messages. The transceiver module is further configured to send a third message to the server. The third message is used to indicate a transmission cycle of a second system message and a size of a data volume that can be carried in the second system message. The one or more system messages include the second system message.

Figure 12:
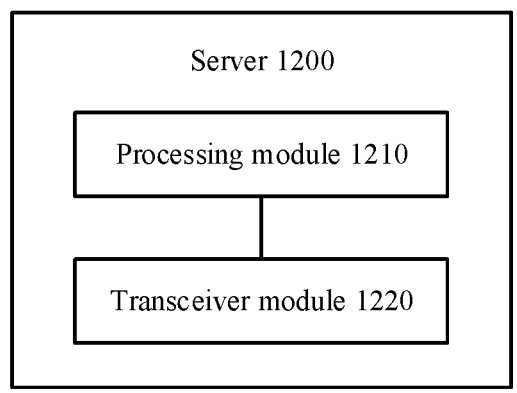
FIG. 12 is another schematic block diagram of a server according to an embodiment of this application.

FIG. 12 is a schematic block diagram of a server 1200 according to an embodiment of this application. As shown in FIG. 12, the server 1200 includes:

a processing module 1210, configured to determine a third transmission parameter used to transmit assistance data, where the third transmission parameter includes at least one of priority information, a time parameter, and a repetition indication parameter, the priority information is used to indicate a priority of each data type in the assistance data, the time parameter is used to indicate expiration time information of each data type in the assistance data, and the repetition indication parameter is used to indicate a data type that needs to be repeatedly sent in the assistance data; and a transceiver module 1220, configured to send the assistance data to a network device.

Optionally, the third transmission parameter further includes configuration information, the configuration information is used to request a transmission cycle of each of one or more system messages and/or a size of a data volume that can be carried in each of the one or more system messages. The transceiver module is further configured to receive a third message sent by the network device. The third message is used to indicate a transmission cycle of a second system message and a size of a data volume that can be carried in the second system message. The one or more system messages include the second system message.

Figure 13:
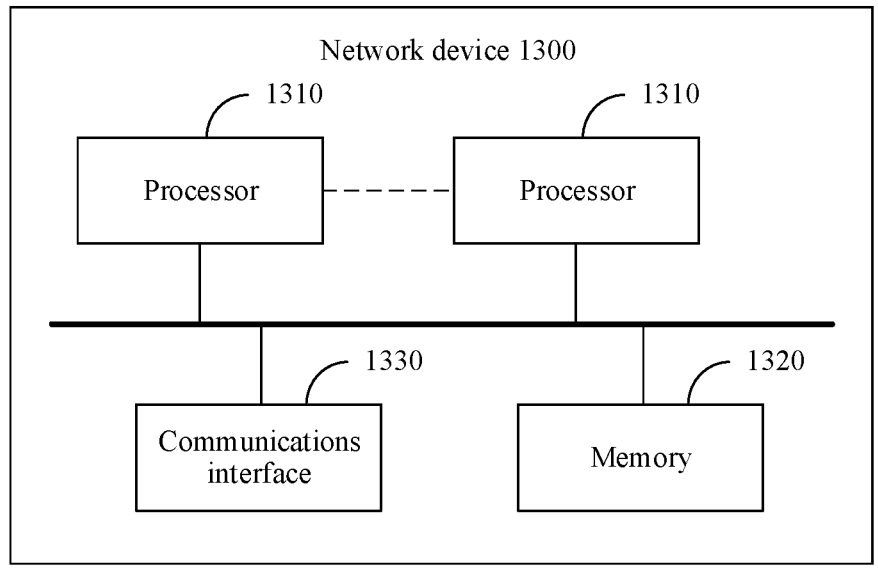
FIG. 13 is still another schematic block diagram of a network device according to an embodiment of this application.

FIG. 13 is a schematic block diagram of a network device 1300 according to an embodiment of this application. The network device 1300 includes one or more processors 1310, a memory 1320, and a communications interface 1330. The one or more processors 1310, the memory 1320, and the communications interface 1330 are all connected by using an internal path.

The memory 1320 is configured to store a computer-executable instruction.

The one or more processors 1310 are configured to execute the computer-executable instruction stored in the memory 1320, so that the network device 1200 can exchange, through the communications interface 1330, data with another apparatus, to perform the data transmission methods provided in the foregoing method embodiments.

The one or more processors 1310 are configured to perform the following operations:

receiving, through the communications interface 1330, a first transmission parameter that is sent by a server and that is used to transmit assistance data, where the first transmission parameter includes configuration information and/or priority information, the configuration information is used to request a transmission cycle of each of one or more system messages and/or a size of a data volume that can be carried in each of the one or more system messages, and the priority information is used to indicate a priority of each data type in the assistance data; and sending, through the communications interface 1330, a first message to the server according to the first transmission parameter, where the first message is used to indicate a transmission cycle of a first system message and a size of a data volume that can be carried in the first system message, and the one or more system messages include the first system message;

or the first message is used to indicate that the network device does not support transmission of the assistance data.

It should be understood that, the network device 1300 may be specifically the network device 800 in the foregoing embodiment, and may be configured to perform steps and/or procedures corresponding to the network device 800 in the foregoing method embodiment.

Figure 14:
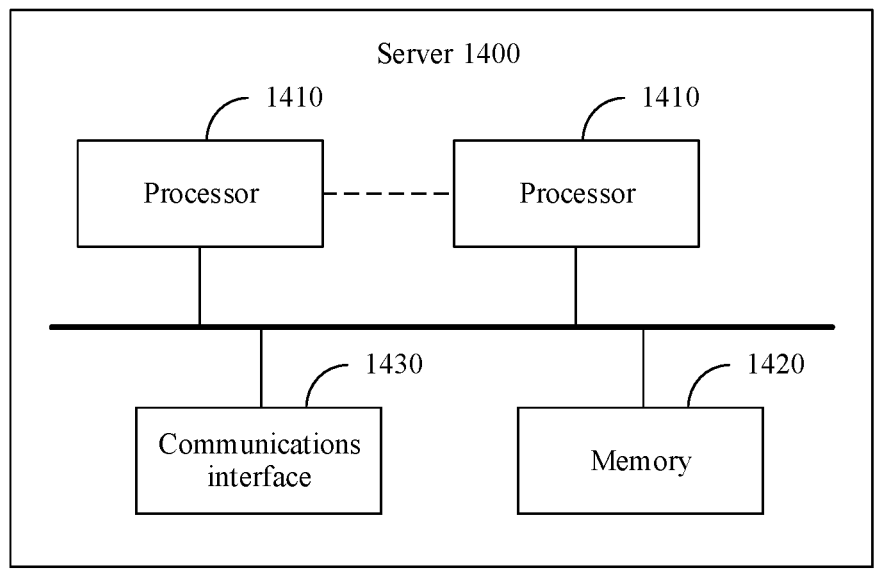
FIG. 14 is still another schematic block diagram of a server according to an embodiment of this application.

FIG. 14 is a schematic block diagram of a server 1400 according to an embodiment of this application. The server 1400 includes one or more processors 1410, a memory 1420, and a communications interface 1430. The one or more processors 1410, the memory 1420, and the communications interface 1430 are all connected by using an internal path.

The memory 1420 is configured to store a computer-executable instruction.

The one or more processors 1410 are configured to execute the computer-executable instruction stored in the memory 1420, so that the server 1400 can exchange, through the communications interface 1430, data with another apparatus, to perform the data transmission methods provided in the foregoing method embodiments.

The one or more processors 1410 are configured to perform the following operations:

determining a first transmission parameter used to transmit assistance data, where the first transmission parameter includes configuration information and/or priority information, the configuration information is used to request a transmission cycle of each of one or more system messages and/or a size of a data volume that can be carried in each of the one or more system messages, and the priority information is used to indicate a priority of each data type in the assistance data;

receiving, through the communications interface 1430, the first transmission parameter sent to a network device; and receiving, through the communications interface 1430, a first message sent by the network device according to the first transmission parameter, where the first message is used to indicate a transmission cycle of a first system message and a size of a data volume that can be carried in the first system message, and the one or more system messages include the first system message; or the first message is used to indicate that the network device does not support transmission of the assistance data.

It should be understood that, the server 1400 may be specifically the server 900 in the foregoing embodiment, and may be configured to perform steps and/or procedures corresponding to the server 900 in the foregoing method embodiment.

Figure 15:
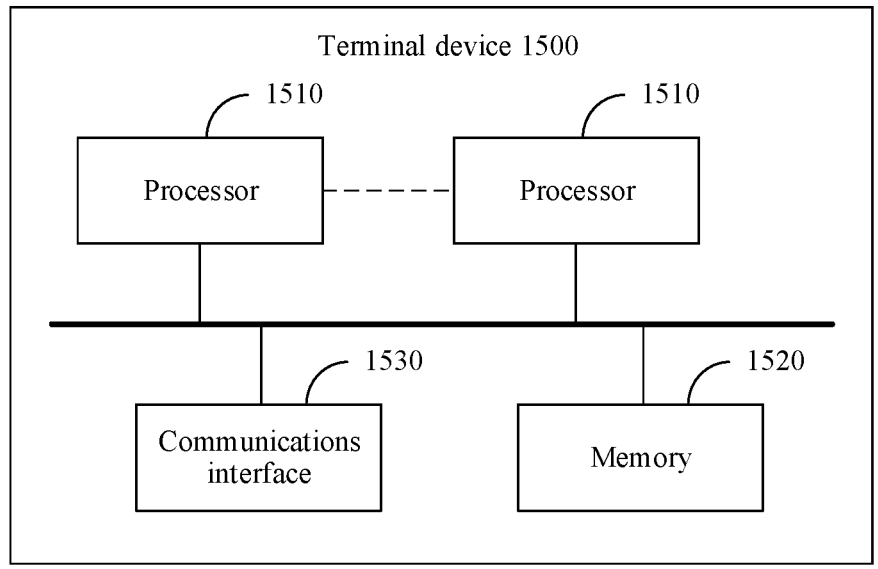
FIG. 15 is still another schematic block diagram of a terminal device according to an embodiment of this application.

FIG. 15 is a schematic block diagram of a terminal device 1500 according to an embodiment of this application. The terminal device 1500 includes one or more processors 1510, a memory 1520, and a communications interface 1530. The one or more processors 1510, the memory 1520, and the communications interface 1530 are all connected by using an internal path.

The memory 1520 is configured to store a computer-executable instruction.

The one or more processors 1510 are configured to execute the computer-executable instruction stored in the memory 1520, so that the terminal device 1500 can exchange, through the communications interface 1530, data with another apparatus, to perform the data transmission methods provided in the foregoing method embodiments.

The one or more processors 1510 are configured to perform the following operations:

receiving, through the communications interface 1530, assistance data sent by a network device according to a transmission parameter, where the transmission parameter includes at least one of configuration information, priority information, a time parameter, and a repetition indication parameter, the configuration information is used to request a transmission cycle of each of one or more system messages and/or a size of a data volume that can be carried in each of the one or more system messages, the priority information is used to indicate a priority of each data type in the assistance data, the time parameter is used to indicate expiration time information of each data type in the assistance data, and the repetition indication parameter is used to indicate a data type that needs to be repeatedly sent in the assistance data; and determining a location of the terminal device according to the assistance data.

It should be understood that, the terminal device 1500 may be specifically the terminal device 1000 in the foregoing embodiment, and may be configured to perform steps and/or procedures corresponding to the terminal device 1000 in the foregoing method embodiment.

Figure 16:
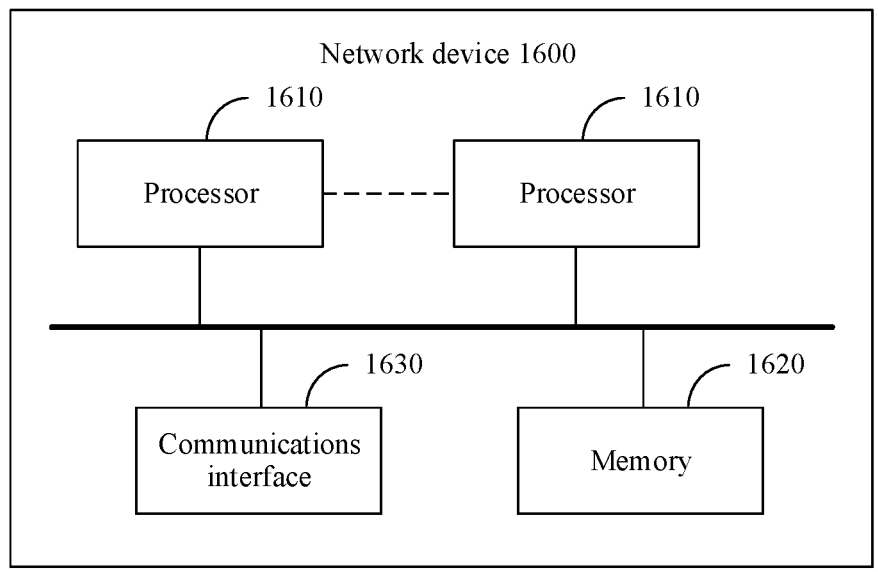
FIG. 16 is still another schematic block diagram of a network device according to an embodiment of this application.

FIG. 16 is a schematic block diagram of a network device 1600 according to an embodiment of this application. The network device 1600 includes one or more processors 1610, a memory 1620, and a communications interface 1630. The one or more processors 1610, the memory 1620, and the communications interface 1630 are all connected by using an internal path.

The memory 1620 is configured to store a computer-executable instruction.

The one or more processors 1610 are configured to execute the computer-executable instruction stored in the memory 1620, so that the network device 1600 can exchange, through the communications interface 1630, data with another apparatus, to perform the data transmission methods provided in the foregoing method embodiments.

The one or more processors 1610 are configured to perform the following operations:

receiving, through the communications interface 1630, assistance data sent by a server and a third transmission parameter used to transmit the assistance data, where the third transmission parameter includes at least one of priority information, a time parameter, and a repetition indication parameter, the priority information is used to indicate a priority of each data type in the assistance data, the time parameter is used to indicate expiration time information of each data type in the assistance data, and the repetition indication parameter is used to indicate a data type that needs to be repeatedly sent in the assistance data; and sending, through the communications interface 1630, all or a part of the assistance data to a terminal device according to the third transmission parameter.

It should be understood that, the network device 1600 may be specifically the network device 1100 in the foregoing embodiment, and may be configured to perform steps and/or procedures corresponding to the network device 1100 in the foregoing method embodiment.

Figure 17:
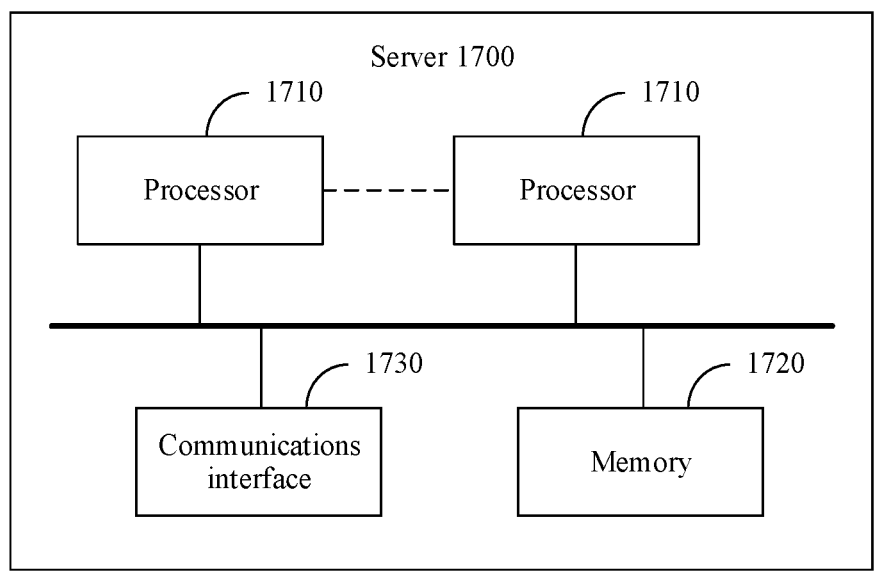
FIG. 17 is still another schematic block diagram of a server according to an embodiment of this application.

FIG. 17 is a schematic block diagram of a server 1700 according to an embodiment of this application. The server 1700 includes one or more processors 1710, a memory 1720, and a communications interface 1730. The one or more processors 1710, the memory 1720, and the communications interface 1730 are all connected by using an internal path.

The memory 1720 is configured to store a computer-executable instruction.

The one or more processors 1710 are configured to execute the computer-executable instruction stored in the memory 1720, so that the server 1700 can exchange, through the communications interface 1730, data with another apparatus, to perform the data transmission methods provided in the foregoing method embodiments.

The one or more processors 1710 are configured to perform the following operations:

determining a third transmission parameter used to transmit the assistance data, where the third transmission parameter includes at least one of priority information, a time parameter, and a repetition indication parameter, the priority information is used to indicate a priority of each data type in the assistance data, the time parameter is used to indicate expiration time information of each data type in the assistance data, and the repetition indication parameter is used to indicate a data type that needs to be repeatedly sent in the assistance data; and sending the assistance data to a network device through the communications interface 1730.

It should be understood that, the server 1700 may be specifically the server 1200 in the foregoing embodiment, and may be configured to perform steps and/or procedures corresponding to the server 1200 in the foregoing method embodiment.

An embodiment of this application further provides a chip system. The chip system includes one or more processors, one or more memories, and an interface circuit. The interface circuit is responsible for information exchange between the chip system and an external device. The one or more memories, the interface circuit, and the one or more processors are interconnected by using a line. The one or more memories store an instruction. The instruction is executed by the one or more processors, so that a network device, a server, or a terminal device can perform operations corresponding to the network device, the server, or the terminal device in the foregoing methods.

An embodiment of this application further provides a communications system. The system includes a network device and/or a server. The network device is the network device in the foregoing aspects, and the server is the server in the foregoing aspects.

An embodiment of this application further provides a computer program product. The computer program product is applied to a network device, and includes a series of instructions. When the instructions are run, the network device, a server, or a terminal device can be enabled to perform operations corresponding to the network device, the server, or the terminal device in the foregoing methods. In the embodiments of this application, it should be noted that the method embodiments in the embodiments of this application may be applied to a processor, or implemented by a processor. The processor may be an integrated circuit chip and has a signal processing capability. In an implementation process, steps in the foregoing method embodiments can be implemented by using a hardware integrated logical circuit in the processor, or by using instructions in a form of software. The processor may be a general purpose processor, a digital signal processor (Digital Signal Processor, DSP), an application specific integrated circuit (Application Specific Integrated Circuit, ASIC), a field programmable gate array (Field Programmable Gate Array, FPGA) or another programmable logical device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory of the systems and methods described in this specification includes but is not limited to these and any memory of another proper type.

It should be understood that "one embodiment" or "an embodiment" mentioned in the entire specification means that particular features, structures, or characteristics related to the embodiment are included in one or more embodiments of this application. Therefore, "in an embodiment" or "in an embodiment" appearing throughout the specification does not refer to a same embodiment. In addition, these particular features, structures, or characteristics may be combined in one or more embodiments by using any appropriate manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of this application, "B corresponding to A" indicates that B is associated with A, and B may be determined according to A. However, it should further be understood that determining A according to B does not mean that B is determined according to A only; that is, B may also be determined according to A and/or other information.

All or some of the foregoing embodiments may be implemented by using software, hardware, firmware, or any combination thereof. When software is used to implement the embodiments, the embodiments may be implemented completely or partially in a form of a computer program product. The computer program product may include one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive Solid State Disk (SSD), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. According to such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
receiving, by a network device, a transmission parameter from a server, wherein the transmission parameter comprises configuration information and priority information, wherein the configuration information indicates a transmission cycle of each of one or more System Information Blocks (SIBs), wherein the one or more SIBs carry assistance data, and wherein the priority information indicates priority of the assistance data; and sending, by the network device, the assistance data to a terminal device according to the transmission parameter.

2. The method according to claim 1, further comprising: receiving, by the network device, the assistance data from the server.

3. The method according to claim 1, wherein the assistance data comprises a time parameter, wherein the time parameter include an expiration time, and wherein the expiration time indicates expiration time information of the assistance data.

4. The method according to claim 1, wherein the server is an evolved serving mobile location center (E-SMLC).

5. The method according to claim 1, wherein the priority information is represented by an integer, and 1 indicates a highest priority.

6. A data transmission method, comprising:
obtaining, by a server, a transmission parameter, wherein the transmission parameter comprises configuration information and priority information, wherein the configuration information indicates a transmission cycle of each of one or more System Information Blocks (SIBs), wherein the one or more SIBs carry assistance data, and wherein the priority information indicates priority of the assistance data; and
sending, by the server, the transmission parameter to a network device.

7. The method according to claim 6, further comprising: sending, by the server, the assistance data to the network device.

8. The method according to claim 6, wherein the assistance data comprises a time parameter, wherein the time parameter include an expiration time, and wherein the expiration time indicates expiration time information of the assistance data.

9. The method according to claim 6, wherein the server is an evolved serving mobile location center (E-SMLC).

10. The method according to claim 6, wherein the priority information is represented by an integer, and 1 indicates a highest priority.

11. An apparatus, comprising:
at least one processor; and
one or more memories coupled to the at least one processor and storing programming instructions for execution by the at least one processor to perform operations comprising:
receiving a transmission parameter from a server, wherein the transmission parameter instructs the apparatus to transmit assistance data, wherein the transmission parameter comprises configuration information and priority information, wherein the configuration information indicates a transmission cycle of each of one or more System Information Blocks (SIBs), wherein the one or more SIBs carry the assistance data, and wherein the priority information indicates priority of the assistance data; and
sending the assistance data to a terminal device according to the transmission parameter.

12. The apparatus according to claim 11, wherein the programming instructions are for execution by the at least one processor to receive the assistance data from the server.

13. The apparatus according to claim 11, wherein the assistance data comprises a time parameter, wherein the time parameter include an expiration time, and wherein the expiration time indicates expiration time information of the assistance data.

14. The apparatus according to claim 11, wherein the server is an evolved serving mobile location center (E-SMLC).

15. The apparatus according to claim 11, wherein the priority information is represented by an integer, and 1 indicates a highest priority.

16. An apparatus, comprising:
at least one processor; and
one or more memories coupled to the at least one processor and storing programming instructions for execution by the at least one processor to perform operations comprising:
obtaining a transmission parameter, wherein the transmission parameter comprises configuration information and priority information, wherein the configuration information indicates a transmission cycle of each of one or more System Information Blocks (SIBs), wherein the one or more SIBs are used to carry assistance data, and wherein the priority information indicates priority of the assistance data; and
sending the transmission parameter to a network device, wherein the transmission parameter instructs the network device to transmit the assistance data.

17. The apparatus according to claim 16, wherein the operations further comprise:
sending the assistance data to the network device.

18. The apparatus according to claim 16, wherein the assistance data comprises a time parameter, wherein the time parameter include an expiration time, and wherein the expiration time indicates expiration time information of the assistance data.

19. The apparatus according to claim 16, wherein the apparatus is an evolved serving mobile location center (E-SMLC).

20. The apparatus according to claim 16, wherein the priority information is represented by an integer, and 1 indicates a highest priority.

* * * * *